(12) United States Patent
Carlson et al.

(10) Patent No.: US 7,779,109 B2
(45) Date of Patent: Aug. 17, 2010

(54) FACILITATING SYNCHRONIZATION OF SERVERS IN A COORDINATED TIMING NETWORK

(75) Inventors: Scott M. Carlson, Tucson, AZ (US); Donald Crabtree, Port Ewen, NY (US); Dennis J. Dahlen, Rhinebeck, NY (US); Noshir R. Dhondy, Saugerties, NY (US); David A. Elko, Austin, TX (US); Michel H. T. Hack, Cortlandt Manor, NY (US); Denise M. Sevigny, Wappingers Falls, NY (US); Ronald M. Smith, Sr., Wappingers Falls, NY (US); David E. Whitney, Poughkeepsie, NY (US); Judith A. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 11/876,152

(22) Filed: Oct. 22, 2007

(65) Prior Publication Data
US 2008/0183895 A1 Jul. 31, 2008

Related U.S. Application Data

(60) Provisional application No. 60/887,584, filed on Jan. 31, 2007.

(51) Int. Cl.
*G06F 15/173* (2006.01)
(52) U.S. Cl. ............... 709/223; 709/224; 709/203; 709/219; 370/395.62
(58) Field of Classification Search ............ 709/223, 709/224, 203, 219; 370/395.62
See application file for complete search history.

(56) References Cited

U.S. PATENT DOCUMENTS

| 4,894,846 | A | 1/1990 | Fine | 375/107 |
|---|---|---|---|---|
| 5,848,028 | A | 12/1998 | Burklin | 368/46 |
| 5,925,107 | A | 7/1999 | Bartfai et al. | 709/248 |
| 6,173,023 | B1 | 1/2001 | Tanonaka et al. | 375/357 |
| 6,351,821 | B1 | 2/2002 | Voth | |
| 6,535,491 | B2 | 3/2003 | Dutt et al. | |
| 6,606,362 | B1 | 8/2003 | Dalzell et al. | 374/356 |

(Continued)

FOREIGN PATENT DOCUMENTS

WO  WO 01/95550 A2  12/2001

OTHER PUBLICATIONS

"The Network Time Protocol Version 4 Protocol Specification; J. Burbank et al., draft-ietf-ntp-ntpv4-proto-02.txt", IETF Standard-Working-Draft, Internet Engineering Task Force, IETF, CH, vol. ntp, No. 2, Mar. 2006, XP015045008, ISSN: 0000-0004.

(Continued)

*Primary Examiner*—Lashonda T Jacobs
(74) *Attorney, Agent, or Firm*—John E. Campbell; Blanche E. Schiller, Esq.; Heslin Rothenberg Farley & Mesiti P.C.

(57) ABSTRACT

A timing network is provided that includes a plurality of servers. The servers of the network obtain information used to maintain the servers in time synchronization, thus ensuring the integrity of the servers.

24 Claims, 29 Drawing Sheets

U.S. PATENT DOCUMENTS

| | | | |
|---|---|---|---|
| 6,697,382 | B1 | 2/2004 | Eatherton |
| 6,714,563 | B1 | 3/2004 | Kushi ........................ 370/503 |
| 6,742,044 | B1 | 5/2004 | Aviani et al. |
| 6,768,452 | B2 * | 7/2004 | Gilkes .................. 342/357.15 |
| 7,139,346 | B2 * | 11/2006 | Skahan et al. ............... 375/356 |
| 7,356,725 | B2 | 4/2008 | Engler |
| 7,394,802 | B2 * | 7/2008 | Jun et al. .................... 370/350 |
| 7,395,448 | B2 | 7/2008 | Smith |
| 7,454,648 | B2 | 11/2008 | Dahlen |
| 7,475,272 | B2 | 1/2009 | Carlson |
| 7,539,777 | B1 * | 5/2009 | Aitken ........................ 709/248 |
| 2002/0027886 | A1 | 3/2002 | Fischer et al. |
| 2002/0073228 | A1 | 6/2002 | Cognet et al. .............. 709/236 |
| 2002/0078243 | A1 * | 6/2002 | Rich et al. .................. 709/248 |
| 2002/0131370 | A1 | 9/2002 | Chuah et al. ................ 370/252 |
| 2003/0035444 | A1 | 2/2003 | Zwack ........................ 370/503 |
| 2003/0152177 | A1 | 8/2003 | Cahill-O'Brien et al. .... 375/354 |
| 2004/0073718 | A1 * | 4/2004 | Johannessen et al. ....... 709/400 |
| 2004/0125822 | A1 * | 7/2004 | Jun et al. .................... 370/503 |
| 2004/0167990 | A1 * | 8/2004 | Peer ........................... 709/248 |
| 2005/0020275 | A1 | 1/2005 | Agrawala et al. |
| 2005/0033862 | A1 | 2/2005 | Blum et al. ................. 709/248 |
| 2007/0086489 | A1 | 4/2007 | Carlson |
| 2007/0086490 | A1 | 4/2007 | Carlson |
| 2008/0059655 | A1 | 3/2008 | Carlson |
| 2008/0059808 | A1 | 3/2008 | Engler |
| 2008/0072097 | A1 | 3/2008 | Check |
| 2008/0183849 | A1 | 7/2008 | Carlson |
| 2008/0183877 | A1 | 7/2008 | Carlson |
| 2008/0183896 | A1 | 7/2008 | Carlson |
| 2008/0183897 | A1 | 7/2008 | Carlson |
| 2008/0183898 | A1 | 7/2008 | Carlson |
| 2008/0183899 | A1 | 7/2008 | Carlson |
| 2008/0184060 | A1 | 7/2008 | Carlson |

OTHER PUBLICATIONS

"Internet Time Synchronization: The Network Time Protocol", D. L. Mills, IEEE Transactions on Communications, IEEE Service Center, Piscataway, NY, US, vol. 39, No. 10, Oct. 1, 1991, pp. 1482-1493, XP000275311, ISSN: 0090-6778.

"Time Server In Advanced Automation Local Area Network", L.S. Liang, Computer Standards and Interfaces, Elsevier Sequoia, Lausanne,CH, vol. 6, No. 3, Jan. 1989,pp. 223-227, XP000112504, ISSN:0920-5489.

PCT Notification of Transmittal of the International Search Report and the Written Opinion of the International Searching Authority, or the Declaration; International Application No. PCT/EP2008/050620; International Filing Date: Jan. 1, 2008.

"z/Architecture Principles of Operation," IBM Publication No. SA22-7832-04, Sep. 2005.

Kadoch, Michel, "ATM Signalling: A Tutorial," Canadian Conference on Electrical and Computer Engineering—Congres Canadien En Genie Electrique Et Informatique, vol. 1, Sep. 5, 1995; pp. 420-423, XP000618815; p. 421-p. 422.

Office Action for U.S. Appl. No. 11/940,558 dated Sep. 3, 2009.

PCT Notification of Transmittal of the International Search Report and the Written Opinion of the International Searching Authority, or the Declaration; International Application No. PCT/EP2008/050739.

PCT Notification of Transmittal of the International Search Report and the Written Opinion of the International Searching Authority, or the Declaration; International Application No. PCT/EP2008/050726.

PCT Notification of Transmittal of the International Search Report and the Written Opinion of the International Searching Authority, or the Declaration; International Application No. PCT/EP2008/050524.

PCT Notification of Transmittal of the International Search Report and the Written Opinion of the International Searching Authority, or the Declaration; International Application No. PCT/EP2008/050482.

Office Action for U.S. Appl. No. 11/876,199 dated Oct. 26, 2009.

Office Action for U.S. Appl. No. 11/876,240 dated Oct. 26, 2009.

Office Action for U.S. Appl. No. 11/876,272 dated Oct. 16, 2009.

Office Action for U.S. Appl. No. 11/940,518 dated Oct. 15, 2009.

Office Action for U.S. Appl. No. 11/876,240 dated Mar. 19, 2010.

U.S. Appl. No. 12/748,539, filed Mar. 29, 2010, entitled "Channel Subsystem Server Time Protocol Commands," Carlson et al.

Final Office Action for U.S. Appl. No. 11/940,518 dated Apr. 2, 2010.

* cited by examiner

CTN CONTAINING AN STP NETWORK AND NO ETR NETWORK

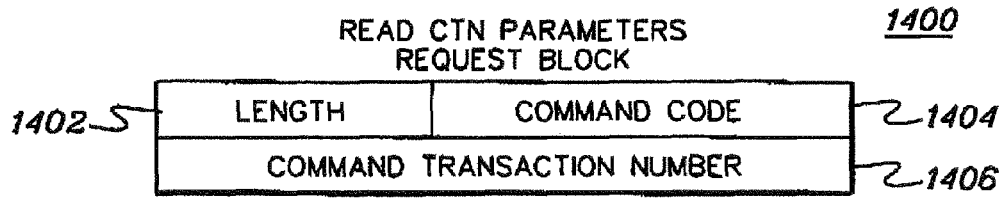
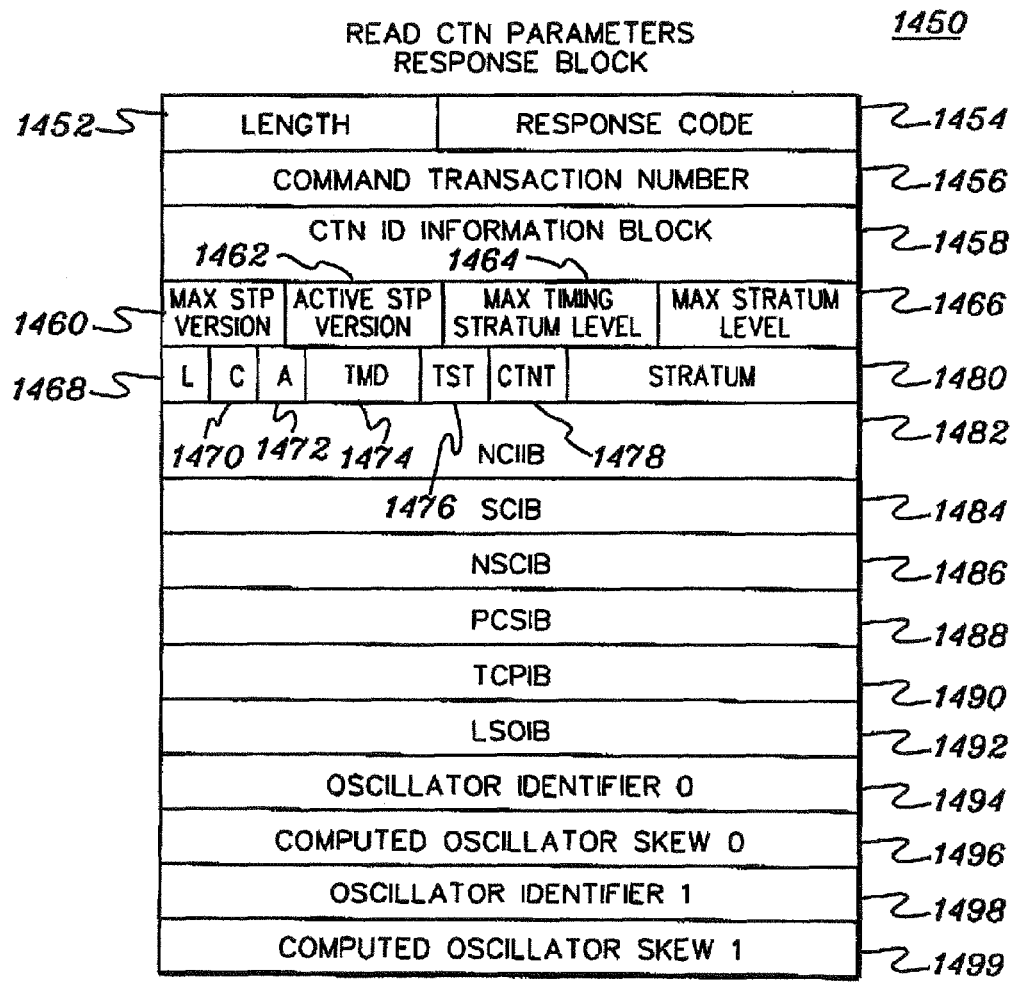

FACILITATING SYNCHRONIZATION OF SERVERS IN A COORDINATED TIMING NETWORK

CROSS-REFERENCE TO RELATED APPLICATIONS

This application claims priority to U.S. Provisional Application No. 60/887,584, entitled "FACILITATING SYNCHRONIZATION OF SERVERS IN A COORDINATED TIMING NETWORK", filed Jan. 31, 2007, which is hereby incorporated herein by reference in its entirety.

TECHNICAL FIELD

This invention relates, in general, to time synchronization within and across a network of processing units, and in particular, to defining a timing network and providing a definition of the network to servers of the network to facilitate synchronization of the servers.

BACKGROUND OF THE INVENTION

For performance and data integrity, computing systems that access shared data, such as a Sysplex offered by International Business Machines Corporation, Armonk, N.Y., must be able to maintain time of day (TOD) clock synchronization to an accuracy that is better than best case communication time between the systems. Currently, in one example, to meet the synchronization requirements, a timer, such as the IBM Sysplex Timer®, is used. This timer requires expensive dedicated timing links and a separate external box. IBM® and IBM Sysplex Timer® are registered trademarks of International Business Machines Corporation, Armonk, N.Y.

Networks, such as the Network Timing Protocol (NTP), provide time synchronization, but do not meet the accuracy requirements of high-end systems. NTP requires that each server has access to an external time source that provides accuracy to a microsecond level in order to ensure all servers synchronize to the same reference time. This is a problem for those systems that do not have a capability to attach to external time servers that provide this level of accuracy. Further, a requirement of GPS receivers or similar attachment on each system may be considered infeasible for maintenance, security and reliability reasons.

SUMMARY OF THE INVENTION

Based on the foregoing, a need exists for a capability that facilitates the providing of time synchronization. In one example, a need exists for a capability that defines a timing network and enables this definition to be obtained by the servers of the network and used to provide time synchronization.

The shortcomings of the prior art are overcome and additional advantages are provided through the provision of an article of manufacture that includes at least one computer usable medium having computer readable program code logic to provide a coordinated timing network. The computer readable program code logic when executing performing, for instance, the following: obtaining by a server of a timing network timing clock information for the server from a single primary active server of the timing network, the single primary active server being the primary reference time to the server; obtaining by the server timing network data including configuration information of the timing network, primary reference time information, time zone information, and leap second change scheduling; using by the server at least a portion of the timing network data and the timing clock information to ensure the server of the timing network is adhering to the configuration and is synchronized to a coordinated server time (CST) timing network specified synchronization threshold that meets high-speed computing requirements; and recognizing by the server that it is out of synchronization and may not have valid configuration information.

Systems and methods relating to one or more aspect of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 14A depicts one embodiment of a read CTN parameters request block, in accordance with an aspect of the present invention;

FIG. 14B depicts one embodiment of a read CTN parameters response block, in accordance with an aspect of the present invention;

DETAILED DESCRIPTION OF THE INVENTION

Figure 1A:
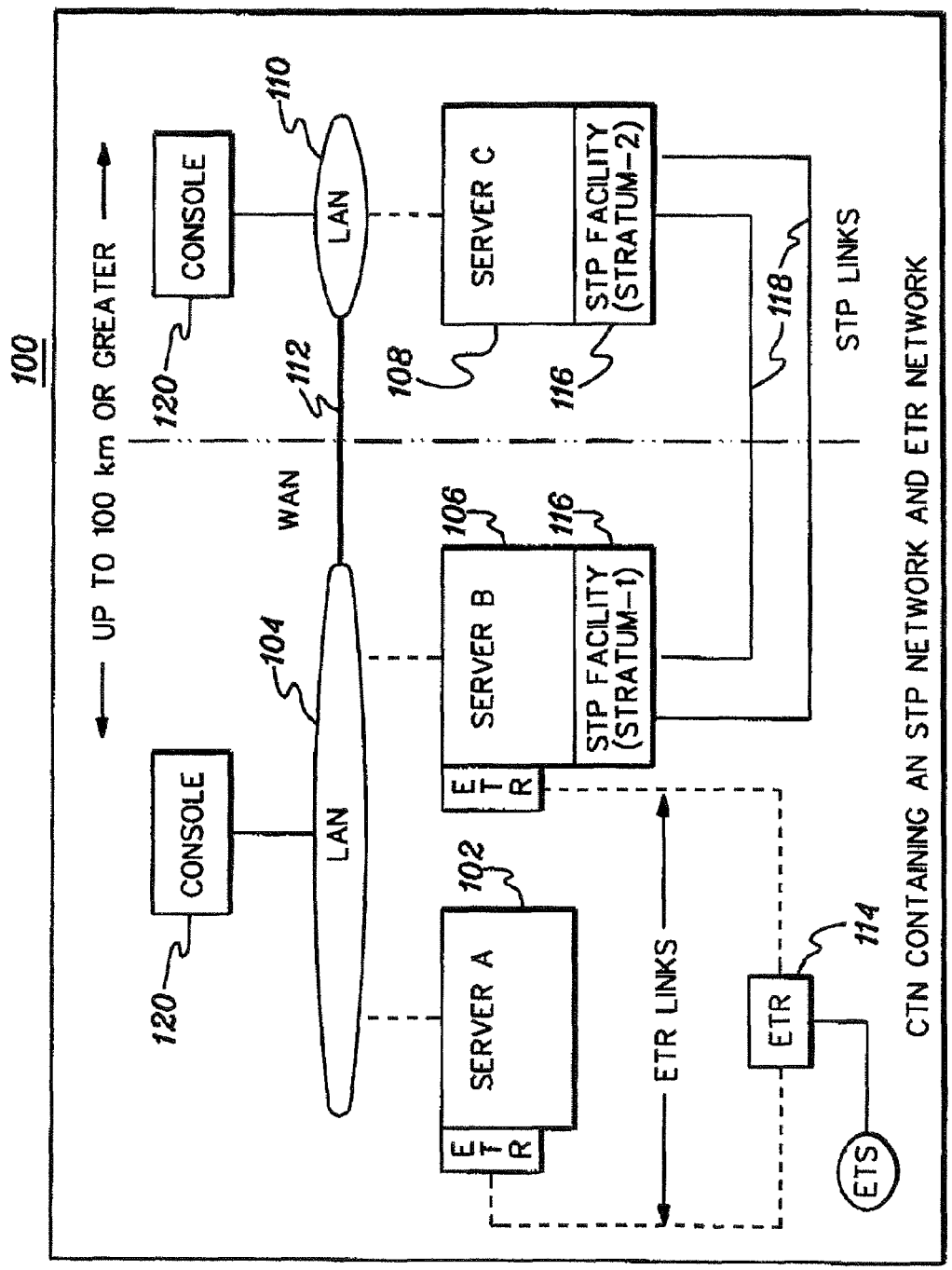
FIG. 1A depicts one example of a mixed coordinated timing network to incorporate one or more aspects of the present invention.

In accordance with an aspect of the present invention, a capability is provided for defining a stratum-1 configuration for a timing network that includes a single active stratum-1 server usable in ensuring that the servers in the network use the same primary reference time to synchronize their clocks. Thus, the servers in the network are synchronizing to the same root primary reference time and synchronization accuracy is not dependent on the quality of an external time source or of the existence of an external time source at the stratum-1 server.

In a further aspect of the present invention, the stratum-1 configuration is maintained in a stratum-1 configuration information block that is provided to the servers of the network, along with other information, which is used to ensure the integrity of the servers. Since each server in the network is aware of the identity of the stratum-1 server, servers that indicate they are synchronized to another stratum-1 server are not permitted to join the network.

In yet a further aspect of the present invention, recovery procedures are provided to handle a failure of the active stratum-1 server of the network.

Although various networks can be configured to include a stratum-1 server, one such network is a Coordinated Timing Network (CTN). In a Coordinated Timing Network, multiple distinct computing systems maintain time synchronization to form the Coordinated Timing Network. Systems in the Coordinated Timing Network employ a message based protocol, referred to as a Server Time Protocol (STP), to pass timekeeping information between the systems over existing, high-speed data links. This enables the time of day (TOD) clocks at each system to be synchronized to the accuracy required in today's high-end computing systems. Since the protocol makes use of technology within a computing system, synchronization accuracy scales as technology improves. A computing system that provides an STP facility is referred to as a time server or server herein.

A server defined in a CTN as a primary time server provides primary reference time for the CTN. The server in a CTN that determines CST (an estimate of the time-of-day (TOD) clock for the CTN) based on information from another server in the CTN is referred to as the secondary time server. The primary time server may obtain its time from an external time source, which provides the means to synchronize the time of day clocks in a CTN to a defined time standard.

Servers in a CTN that are in the synchronized state are assigned a value, referred to as a stratum level, that specifies the number of servers between it and a primary time server. A primary time server operates at a stratum level of 1; secondary time servers operate at a stratum level of 2 or above, which increases as the number of servers in the timing path to the stratum-1 increases. In general, the quality of timekeeping information decreases as the stratum level increases. The server that is unsynchronized is assigned a stratum level of 0.

The STP facility provides the procedures required to transmit, receive and process STP messages. STP messages are transmitted over one or more physical data links between servers. The data link that has been established between two servers is referred to as an STP path. The STP facility provides the facilities to establish and maintain STP paths.

STP messages include a message command and a message response. Two types of STP messages are supported. The exchange time parameters (XTP) message and the STP control (STC) message. The XTP message is used to exchange the timekeeping information used to determine CST for the CTN. STP control messages are used to set and modify various CTN parameters required by servers in the CTN.

A CTN can operate, for instance, as one of two types of configurations: either as a mixed CTN configuration or as an STP-only CTN configuration. In a mixed CTN configuration, the servers are configured to be part of both an STP network and an External Time Reference (ETR) network. In a mixed CTN configuration, the servers in the CTN are configured with the same, non-null ETR network ID and a timer (e.g., IBM Sysplex Timer®) provides the primary time reference for the CTN. At least one server in the CTN is to step to timing signals provided by the SYSPLEX timer before synchronization can occur within the CTN. Servers not stepping to the sysplex timer are secondary time servers and achieve synchronization by exchanging STP signals.

As one example, each server stepping to the timing signals of the SYSPLEX timer receives the time protocol parameters and propagates the information to secondary time servers in the CTN, using, for instance, a CTN parameter update procedure. An example of this procedure is described in U.S. Ser. No. 11/468,352, entitled "Coordinated Timing Network Configuration Parameter Update Procedure," Carlson et al., filed Aug. 30, 2006, which is hereby incorporated herein by reference in its entirety.

One example of a mixed CTN configuration 100 is described with reference to FIG. 1A. Mixed CTN configuration 100 includes, for instance, a Server A (102) coupled to a local area network (104), a Server B (106) coupled to local area network (104) and a Server C (108) coupled to a local area network (110). Each server is, for instance, a central processing complex based on the z/Architecture® offered by International Business Machines Corporation. z/Architecture® is a registered trademark of International Business Machines Corporation, Armonk, N.Y., USA. One embodiment of the z/Architecture® is described in "z/Architecture Principles of Operation," IBM Publication No. SA22-7832-04, September 2005, which is hereby incorporated herein by reference in its entirety.

Each local area network is coupled to a console 120 used in providing time synchronization within the network. Further, local area network 104 and local area network 110 are coupled to one another via a wide area network 112.

Servers A and B are coupled to an external time reference network 114, and Servers B and C are configured to be part of an STP network 116. Server B is at a stratum-1 level and Server C is at a stratum-2 level. STP links 118 are used to couple the STP facility of Server B with the STP facility of Server C.

Figure 1B:
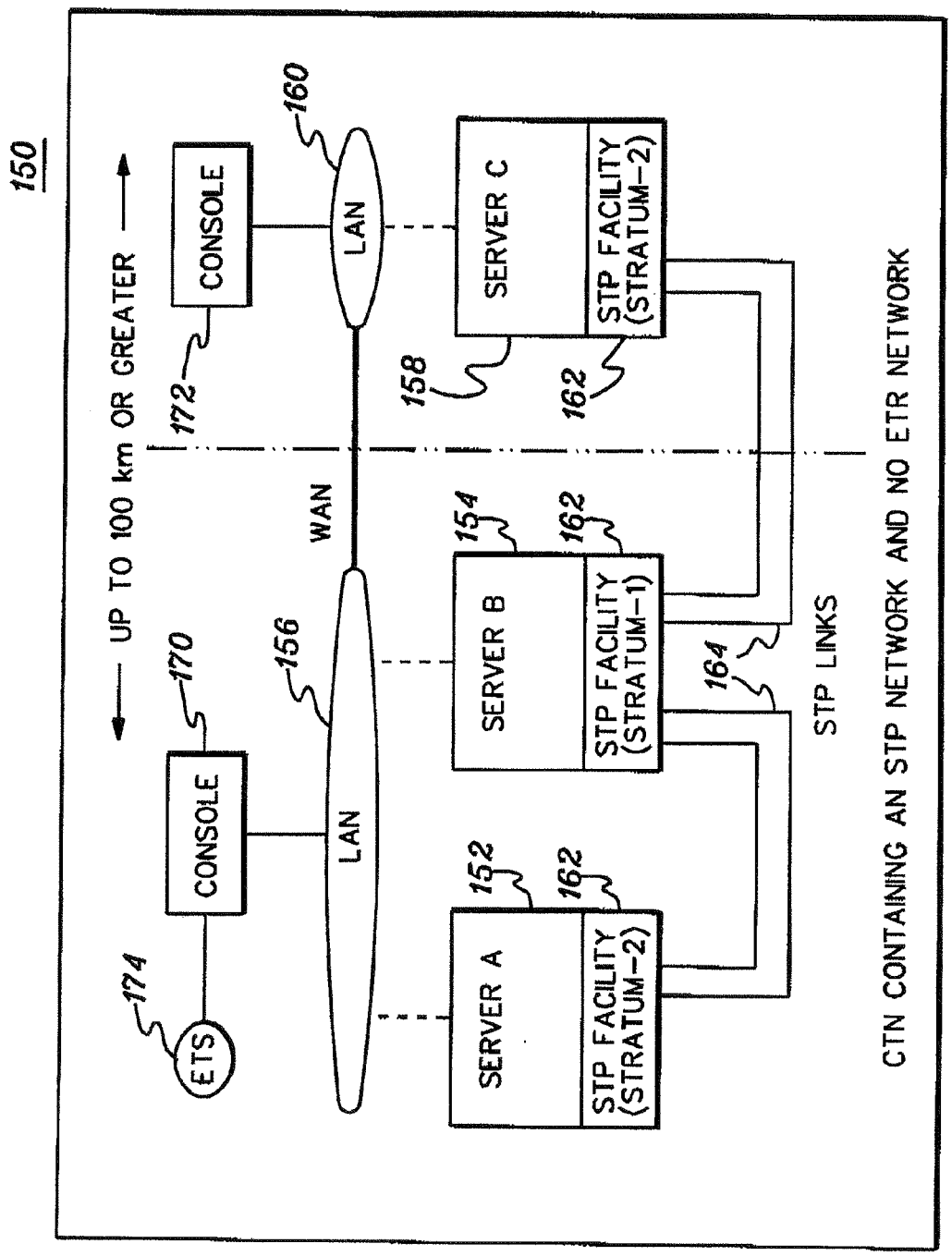
FIG. 1B depicts one example of an STP-only network to incorporate one or more aspects of the present invention.

In an STP-only CTN, the servers in the CTN are configured to be part of an STP network and none are configured to be part of an ETR network. One example of an STP-only network 150 is described with reference to FIG. 1B. In this example, Server A (152) and Server B (154) are coupled to a LAN (156), and Server C (158) is coupled to a LAN (160). Each of the servers includes an STP facility 162, and each facility is coupled to one another via one or more STP links 164.

Further, LAN 156 is coupled to a console 170 and LAN 160 is coupled to a console 172. Console 170 is further coupled to an external time source (ETS) 174, such as a dial out to a telephone time server (e.g., ACTS: NIST Automated Computer Time Service). In this network, there is no ETR network. Server B has a stratum level of 1, and Servers A and C have a stratum level of 2.

The server that is to act as the active stratum-1 server in the network, such as an STP-only network, is specified as part of a stratum-1 configuration defined for the network. The stratum-1 configuration is maintained at each server of the network and provides information relating to the configuration of the network, including, for instance, the type of configuration defined for the network. The network can be configured as one of various types, including, for instance:

a) Null Configuration—In a null configuration, a stratum-1 server is not identified. The server remains unsynchronized until it attaches to a server that has a non-null stratum-1 configuration. The stratum-1 configuration at a server that is at stratum level 0 is equal to the null configuration when, for instance, it is not attached to any other server and the single CEC-CTN indicator in a stratum-1 configuration information block, described below, is zero.

b) Single Server Definition—In a single server definition, the stratum-1 configuration defines a single primary stratum-1 server that acts as the active stratum-1 server for the CTN. The loss of the primary stratum-1 server results in the loss of synchronized time in the CTN until a new stratum-1 configuration is specified from the console.

A single server stratum-1 configuration may also include an indication that the specified stratum-1 server is the only server (e.g., computing electronic complex (CEC) or CPC) in the CTN and that no other or additional servers will be part of the CTN. In this case, the CTN is referred to as a single CEC CTN. When a stratum-1 configuration indicates that it is a single CEC CTN, the configuration is a valid stratum-1 configuration for the initialized state of the server following a power on reset. When a single server stratum-1 configuration does not specify that it is a single CEC CTN, the configuration is not a valid stratum-1 configuration for the initialized state of the server following a power on reset and the stratum-1 configuration is set to the null configuration.

c) Dual Server Configuration—In a dual server configuration, the configuration includes a primary stratum-1 server and an alternate stratum-1 server. The use of a dual server configuration provides a mechanism for an alternate server to be able to take over the role of active stratum-1 server for the CTN. The alternate stratum-1 server, when configured with the same connectivity to other servers in the CTN as the primary stratum-1 server, can take over as the active stratum-1 without disruption to the synchronization capability of the CTN. The stratum-1 server (primary or alternate) that is acting as the active stratum-1 server for a CTN is indicated in the stratum-1 configuration information block maintained at each server in the CTN, as described below. The stratum-1 server that is not the active stratum-1 server is defined as the inactive stratum-1 server.

The inactive stratum-1 server in a dual server configuration takes over the role of the active stratum-1 server when it detects an active stratum-1 failure. An active stratum-1 failure is detected in a dual server configuration when one of the following occurs:

A console assisted recovery procedure is performed and indicates that an active stratum-1 failure has occurred, or A stratum-1 system check signal is recognized.

The inactive stratum-1 server in a dual server configuration performs the console assisted recovery when the inactive stratum-1 server loses attachment to the active stratum-1 server.

d) Triad Configuration—In a triad configuration, the stratum-1 configuration includes a primary stratum-1 server, an alternate stratum-1 server, and an arbiter server. The definition of a triad configuration provides a mechanism for an alternate server to be able to take over the role of active stratum-1 server for the CTN, as defined for a dual server configuration. Additionally, the definition of an arbiter server, when configured with connectivity to both the primary stratum-1 and alternate stratum-1 servers, provides a mechanism for the inactive stratum-1 and arbiter servers to communicate with each other to be able to determine that an active stratum-1 server failure has occurred and that the inactive stratum-1 should take over as the active stratum-1 server.

The inactive stratum-1 server in a triad configuration takes over the role of the active stratum-1 when it recognizes an active stratum-1 failure. The inactive stratum-1 server recognizes an active stratum-1 failure when any of the following occurs:

A triad recovery procedure is performed and indicates that an active stratum-1 failure has occurred.

A console assisted recovery procedure is performed and indicates that an active stratum-1 failure has occurred.

The inactive stratum-1 server performs the triad recovery procedure when the following conditions occur:

The inactive stratum-1 server loses attachment to the active stratum-1 server and has attachment to the arbiter.

The inactive stratum-1 server recognizes an active stratum-1 communication timeout and has attachment to the arbiter.

The inactive stratum-1 server performs the console assisted recovery when the inactive stratum-1 server loses attachment to the active stratum-1 server and is not attached to the arbiter.

The inactive stratum-1 server performs the active stratum-1 takeover procedure to take over the role of the active stratum-1 server for the CTN.

The active stratum-1 server in a triad configuration gives up the role of active stratum-1 server when it detects that it has lost attachment to both the inactive stratum-1 server and the arbiter server. The active stratum-1 server performs an active stratum-1 surrender procedure to give up the role of the active stratum-1 server for the CTN.

In one example, the stratum-1 configuration information is maintained in a control block, referred to as a stratum-1 configuration information block (SCIB), that is stored on or accessible to each server of the network. The SCIB is used to identify the stratum-1 configuration for a network.

Figure 2:
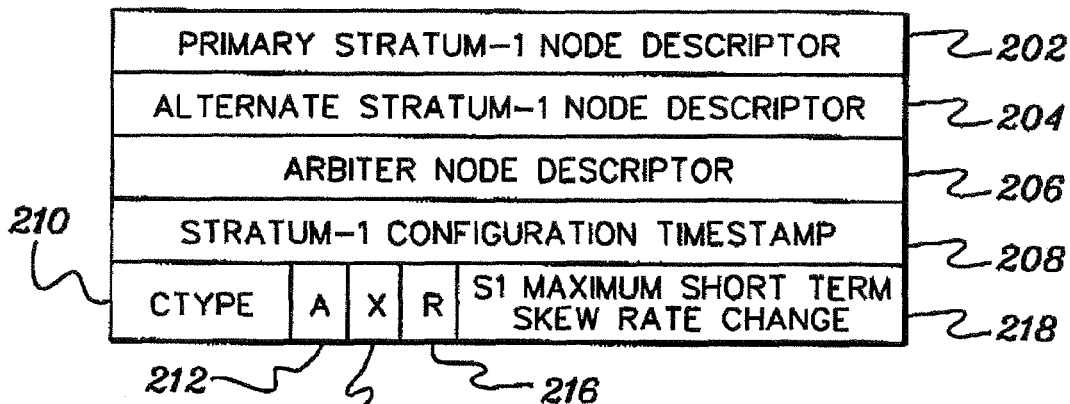
FIG. 2 depicts one example of a stratum-1 configuration information block, in accordance with an aspect of the present invention.

One embodiment of a stratum-1 configuration information block 200 is described with reference to FIG. 2. Stratum-1 configuration information block 200 includes, for instance, the following fields:

a) Primary Stratum-1 Node Descriptor 202: This field is valid when a single server, dual server or triad definition has been specified in the configuration type field of the configuration information block, described below, and when valid, includes the node descriptor of the primary stratum-1 node descriptor.

b) Alternate Stratum-1 Node Descriptor 204: This field is valid when a dual server or triad definition has been specified in the configuration type field, and when valid, includes the node descriptor of the alternate stratum-1 server node descriptor.

c) Arbiter Node Descriptor 206: This field is valid when a triad definition has been specified in the configuration type field and includes the node descriptor of the arbiter server node descriptor.

d) Stratum-1 Configuration Timestamp 208: This field includes a timestamp indicating the time at which the stratum-1 configuration information in this block became current at the server.

e) Configuration Type (CType) 210: This field specifies the type of stratum-1 configuration, as defined below:

Null definition—None of the node descriptors are valid.

Single server definition—Only the primary stratum-1 node descriptor is valid.

Dual server definition: The primary stratum-1 and alternate stratum-1 node descriptors are valid.

Triad definition: The primary stratum-1, alternate stratum-1 and arbiter node descriptors are valid.

f) Active Stratum-1 (A) 212: This field is valid when a dual server or triad definition has been specified and indicates whether the primary stratum-1 server or the alternate stratum-1 server is the active stratum-1 server.

g) Single CEC CTN (X) 214: This field is valid when the configuration type specifies a single server definition and when one, as an example, indicates the CTN is a single CEC CTN. When the field is, for instance, zero, the CTN is not a single CEC CTN.

h) Recovery Configuration (R) 216: This field indicates whether the stratum-1 configuration described by this block is the result of a stratum-1 recovery action or a console command.

i) Stratum-1 Maximum Short Term Skew Rate Change 218: This field includes a value that specifies the maximum possible change in the skew rate of the physical oscillator at the stratum-1 server that may occur over any specified period (e.g., 60 seconds). This field is used to form a value that is in the same format as the base-steering rate.

On machines that are not capable of performing dynamic oscillator switching, the value is equal to the maximum stratum-1 oscillator frequency drift that can occur over a specified period (e.g., 60 seconds). On machines that are capable of performing dynamic oscillator switching, the value is set to the maximum range of skew tolerance specified for the oscillator. For example, on a machine that supports dynamic oscillator switching with oscillator skew tolerance specified at +/−2 ppm to nominal frequency, the value is set to the equivalent of 4 ppm. A dynamic oscillator switch occurs when the physical oscillator used to drive the system TOD clock is switched from one oscillator to another.

In addition to the above control block, another control block, referred to as the new stratum-1 configuration information block (NSCIB), may be used to specify a new stratum-1 configuration for the CTN. Additionally, it may be used to specify an update to the CTN ID that is to occur concurrently with the stratum-1 configuration change.

In one example, the NSCIB at a server is meaningful when the server is configured to be part of an STP-only CTN configuration or if the STP-migration bit in the NSCIB is equal to one.

Figure 3:
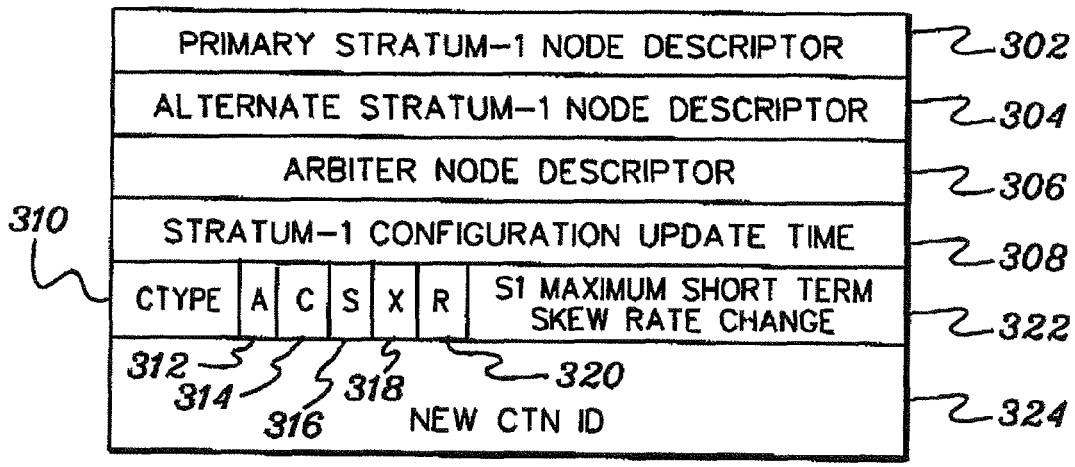
FIG. 3 depicts one example of a new stratum-1 configuration information block, in accordance with an aspect of the present invention.

One embodiment of a new stratum-1 configuration information block 300 is described with reference to FIG. 3. New stratum-1 configuration information block 300 includes, for instance, the following fields:

a) Primary Stratum-1 Node Descriptor 302: This field is valid when a single-server, dual server or triad definition has been specified in the configuration-type field and includes the node descriptor of the new primary stratum-1 node descriptor.

b) Alternate Stratum-1 Node Descriptor 304: This field is valid when a dual server or triad definition has been specified in the configuration-type field and includes the node descriptor of the new alternate stratum-1 node descriptor.

c) Arbiter Node Descriptor 306: This field is valid when a triad definition has been specified in the configuration type field and includes the node descriptor of the new arbiter node descriptor.

d) Stratum-1 Configuration Update Time 308: When the server is configured to be part of an STP-only CTN, this field includes a timestamp that indicates when the values in this block are to become current for CTN.

e) Configuration Type (CType) 310: This field specifies the type of stratum-1 configuration as defined below:
Null definition—None of the node descriptors are valid.
Single server definition—Only the primary stratum-1 node descriptor is valid.
Dual server definition: The primary stratum-1 and alternate stratum-1 node descriptors are valid.
Triad definition: The primary stratum-1, alternate stratum-1 and arbiter node descriptors are valid.

f) Active Stratum-1 (A) 312: This field is valid when a dual server or triad definition has been specified and indicates whether the primary stratum-1 server or the alternate stratum-1 server is the active stratum-1 server.

g) CTN ID Change (C) 314: When the server is configured to be part of an STP-only CTN, this field indicates whether a CTN ID change is being requested and the CTN ID is valid. The change occurs at the stratum-1 configuration update time.

The CTN ID is a value that is used to identify a CTN. The CTN ID includes, for instance, an STP network ID and an ETR network number. The STP network ID identifies the STP network, if any, that is configured for the server. The ETR network number identifies the ETR network number, if any, that is configured for this server.

h) STP Migration Configuration (S) 316: This field is meaningful when, for instance, the server is not configured as an STP-only CTN. The field indicates whether an STP-only migration stratum-1 configuration has been defined for the server. When the field is, for instance, one, the NSCIB includes the stratum-1 configuration that is to become current when the CTN ID at the server is modified to an STP-only configuration. When the field is, for instance, zero, an STP-only migration stratum-1 configuration is not defined for the server.

i) Single CEC CTN (X) 318: This field is valid when the configuration type specifies a single server definition and when one, as an example, indicates the CTN is a single CEC CTN. When the field is, for instance, zero, the CTN is not a single CEC CTN.

j) Recovery Configuration (R) 320: This field indicates whether the stratum-1 configuration described by this block is the result of a stratum-1 recovery action or a console command.

k) Stratum-1 Maximum Short Term Skew Rate Change 322: This field includes a value that specifies the maximum possible change in the skew rate of the physical oscillator at the new stratum-1 server that may occur over any specified period (e.g., 60-seconds).

l) New CTN ID 320: This field is valid when the CTN-ID change indicator specifies a CTN ID change request and a valid CTN ID. This field specifies the new CTN ID.

If the new stratum-1 configuration information block is not to be used to specify an update to the CTN ID, then the block may not include the CTN ID change bit or the new CTN ID, as an example.

Figure 4:
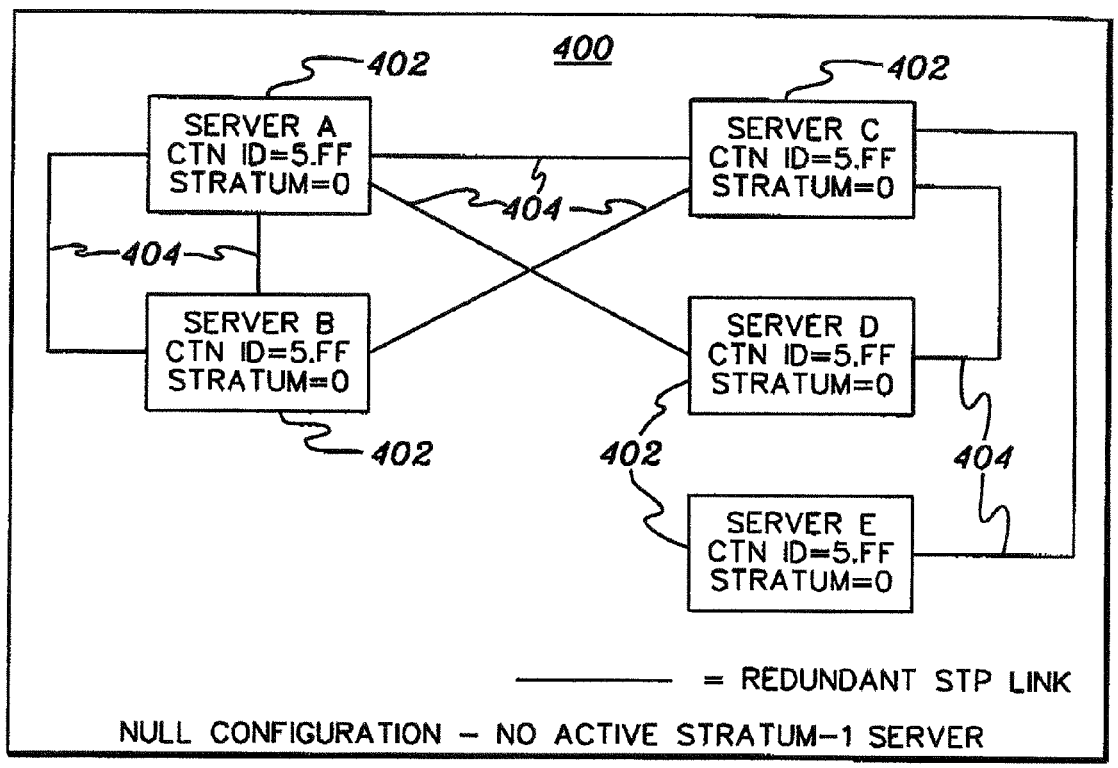
FIG. 4 is a pictorial depiction of a null configuration, in accordance with an aspect of the present invention.

The stratum-1 configuration is initialized at a server to a null configuration at the initial power on of the machine. One example of a null configuration is shown in FIG. 4. As depicted, a null configuration 400 includes a plurality of servers 402, which are coupled to one another via one or more STP links 404. In this example, the stratum level of each server is equal to zero, and thus, there is no active stratum-1 server. However, the CTN ID is set to a particular value, which in this example, is set using a local modify CTN ID console command, as described below.

A CTN that has a null stratum-1 configuration cannot be synchronized, since a stratum-1 has not been specified and there is no reference time for the CTN. The stratum-1 configuration for a CTN can be set back to a null configuration from a non-null configuration via a command, such as the modify stratum-1 configuration command, described below.

Figure 5:
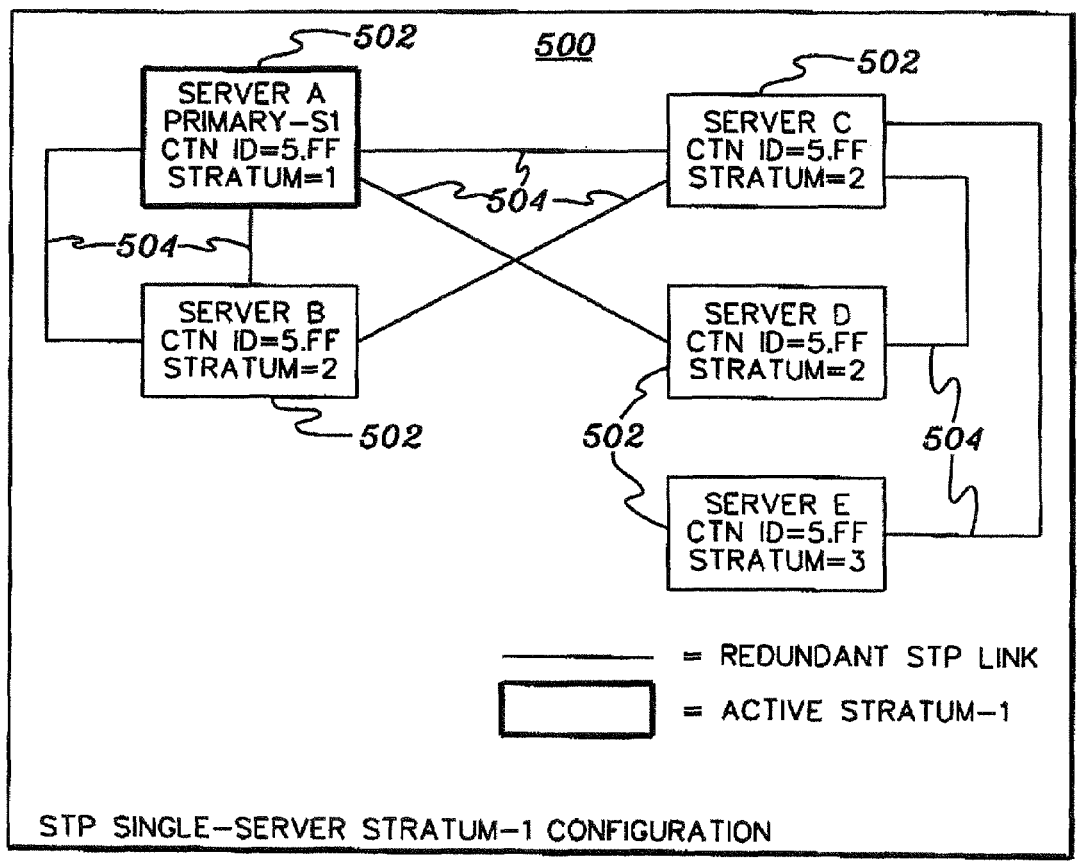
FIG. 5 is a pictorial depiction of a single server stratum-1 configuration, in accordance with an aspect of the present invention.

From a null configuration, a single server stratum-1 can be created. A single server stratum-1 configuration specifies a single stratum-1 server and no alternate stratum-1 or arbiter server. One example of a single server stratum-1 configuration is depicted in FIG. 5. As shown, a single server stratum-1 configuration 500 includes a plurality of servers 502 coupled to one another via one or more STP links 504, and one of the servers, e.g., Server A, is selected as the active primary stratum-1 server. Thus, Server A has an indication of primary-S1 and its stratum level is equal to one. It should be noted that the other servers have stratum values that are greater than one, such as two or three.

Figure 6:
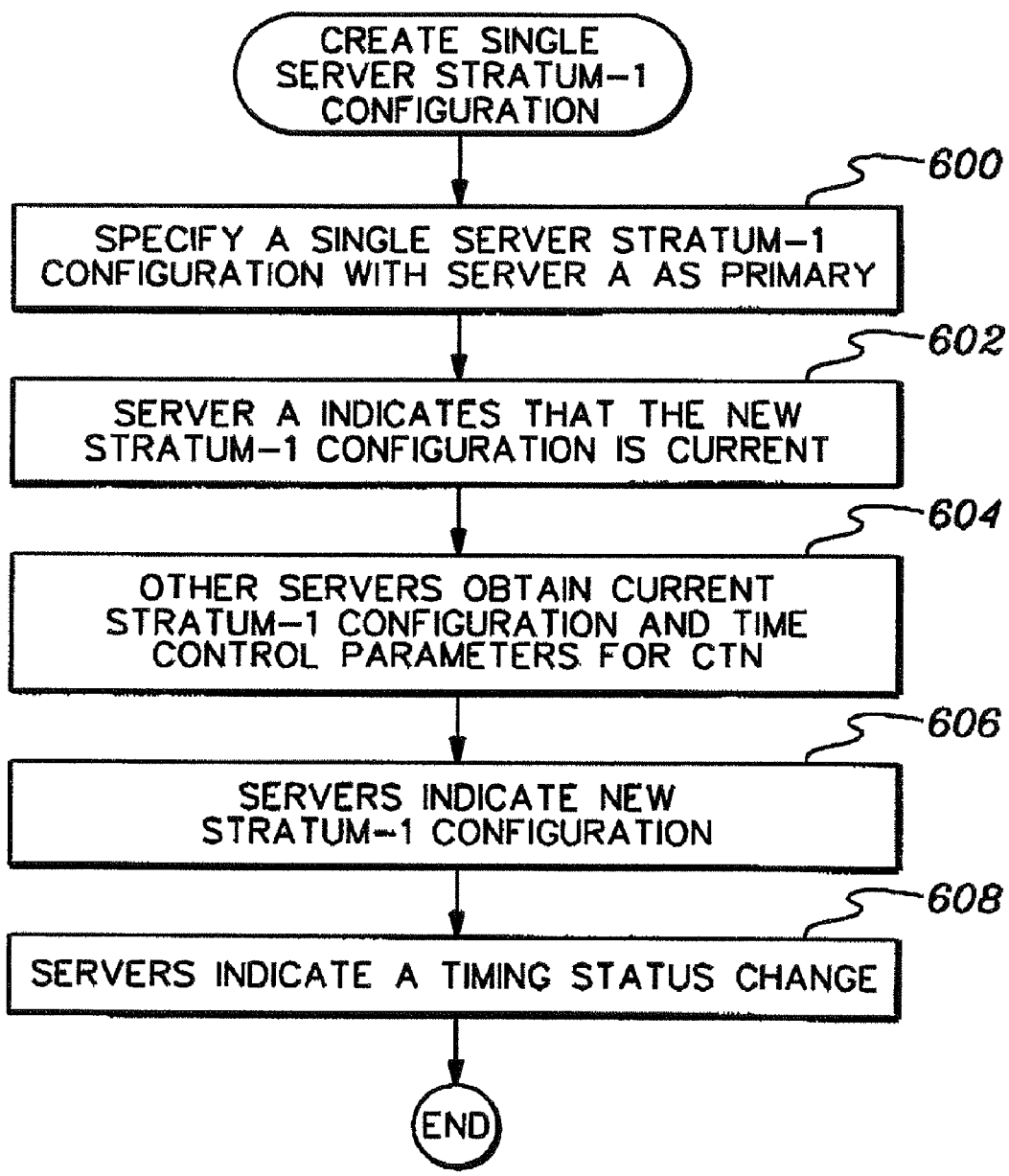
FIG. 6 depicts one embodiment of the logic associated with creating a single server stratum-1 configuration, in accordance with an aspect of the present invention.

One embodiment of the logic associated with creating a single server stratum-1 configuration is described with reference to FIG. 6. Initially, the console issues a command, such as the modify stratum-1 configuration command, to Server A specifying a single server stratum-1 configuration with Server A as the primary stratum-1 server, STEP 600.

Thereafter, Server A indicates that the new stratum-1 configuration is current, STEP 602. In one example, Server A issues a configuration change notification command to the console to provide this indication.

Subsequently, the other servers of the network recognize the availability of a clock source and obtain current stratum-1 configuration and time control parameters for the CTN, STEP 604. In one example, this is performed by the servers issuing a read CTN parameters STP control message to the clock source to obtain the current stratum-1 configuration and time control parameters for the CTN.

Further, the servers issue a configuration change machine check, in one example, to indicate the new stratum-1 configuration, STEP 606. The servers also indicate a timing status change (usable clock source, synchronized) by, for instance, issuing a timing alert external interrupt, STEP 608. This concludes processing associated with creating a single server stratum-1 configuration from a null configuration.

In addition to the above, a dual server configuration can be created from an existing non-null configuration. A dual server stratum-1 configuration specifies a primary and alternate stratum-1 server, either of which may act as the active stratum-1 server for the CTN. The server that is to act as the stratum-1 server is specified by the console at the time the stratum-1 configuration is created and may be modified at any time by the console.

Figure 7:
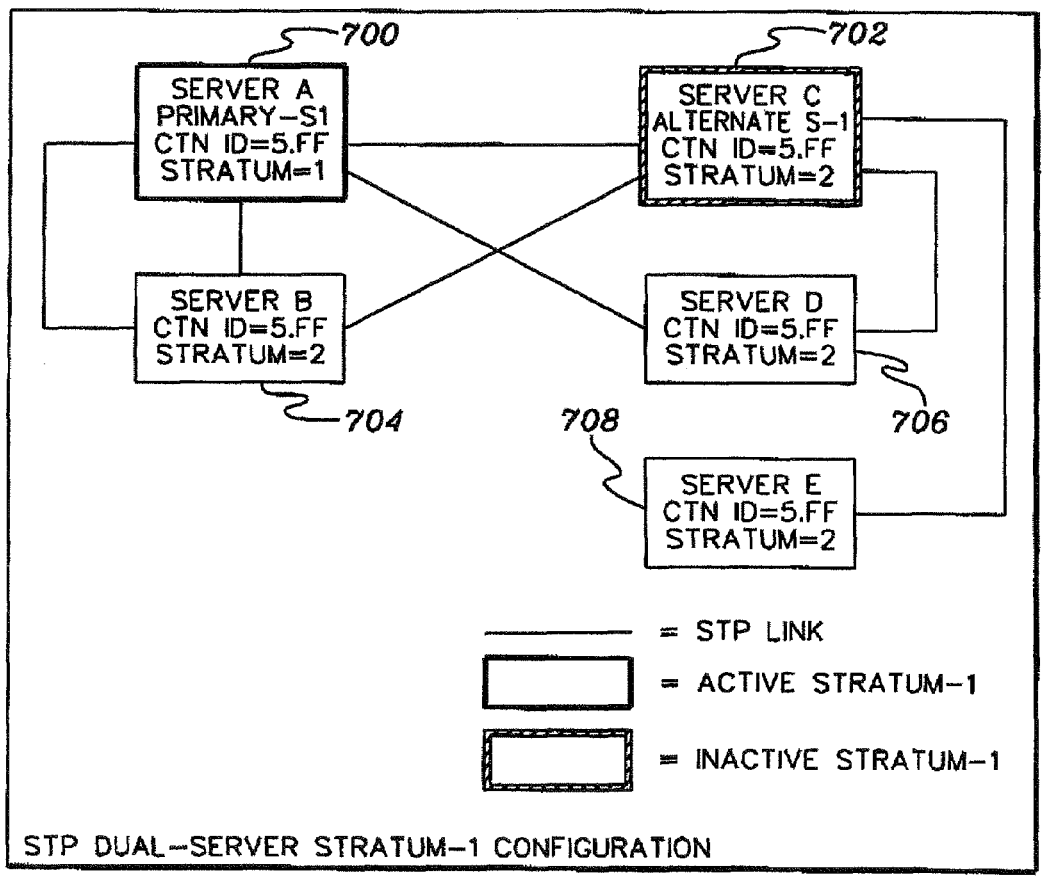
FIG. 7 is a pictorial depiction of a dual server stratum-1 configuration, in accordance with an aspect of the present invention.

One example of a dual server stratum-1 configuration is depicted in FIG. 7. As shown, Server A (700) is indicated as the primary and has a stratum level equal to 1. Server C (702) is indicated as the alternate and has a stratum level equal to 2. Servers B (704) and D (706) have a stratum level equal to two, and Server E (708) has a stratum level equal to 3.

Figure 8:
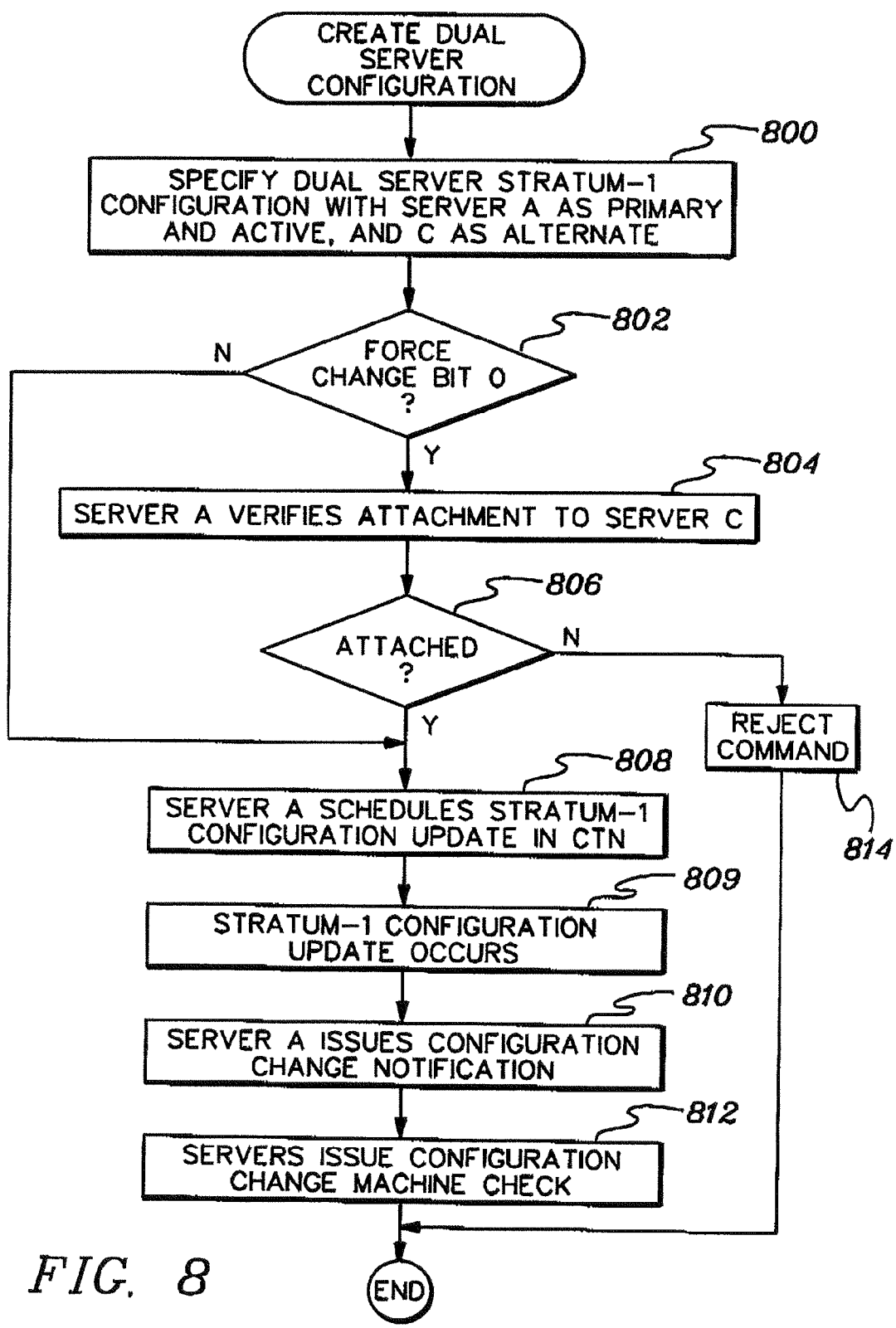
FIG. 8 depicts one embodiment of the logic associated with creating a dual server configuration, in accordance with an aspect of the present invention.

One embodiment of the logic associated with creating a dual server configuration is described with reference to FIG. 8. Initially, a dual server stratum configuration is specified that has Server A as primary and active, and Server C as the alternate, STEP 800. In one example, this is performed by the console issuing a modify stratum-1 configuration command to Server A.

Thereafter, a determination is made as to whether the force change bit in the modify stratum-1 configuration command is 0, INQUIRY 802. If it is 0, Server A verifies that it is directly attached to Server C, STEP 804. In one example, this attachment is verified by exchanging a message with Server C. If the verification indicates that Server A is directly attached to Server C, INQUIRY 806, then Server A schedules a stratum-1 configuration update in the CTN, STEP 808, and the update occurs, STEP 809. Further, Server A issues a configuration change notification command, as an example, to the console when the new stratum-1 configuration becomes current, STEP 810. The servers of the network also issue a configuration change machine check, in response to the new stratum-1 configuration becoming current, STEP 812.

Returning to INQUIRY 802, if the force change bit is set to 1, then processing continues with STEP 808, in which Server A schedules a stratum-1 configuration update in the CTN.

Referring again to INQUIRY 806, if Server A is not attached to Server C, then the command is rejected, STEP 814, and processing completes.

In addition to creating a dual configuration from an existing non-null configuration, a triad configuration may also be created from an existing non-null configuration. A triad stratum-1 configuration specifies a primary stratum-1 server, an alternate stratum-1 server and an arbiter server. Either the specified primary or alternate may act as the active stratum-1 server for the CTN. The server that is to act as the stratum-1 server specified by the console at the time the stratum-1 configuration is created may be modified at any time by the console. The arbiter server is used to help determine when the active stratum-1 server is no longer part of the CTN.

Figure 9:
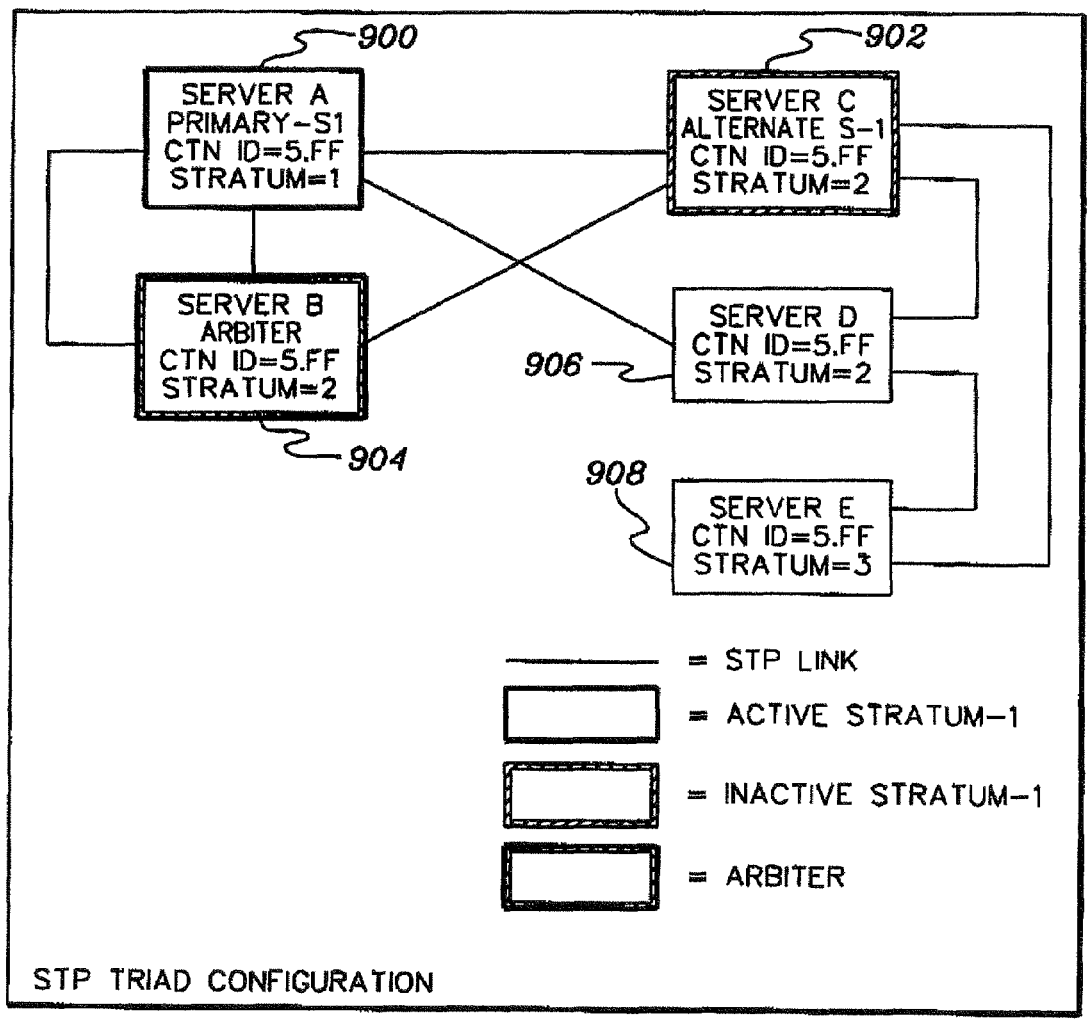
FIG. 9 is a pictorial depiction of a triad configuration, in accordance with an aspect of the present invention.

One example of a triad configuration is depicted in FIG. 9. As shown, Server A (900) is the primary stratum-1 server and it has a stratum level of one. Further, Server C (902) is the alternate stratum-1 server and has a stratum level of 2, and Server B (904) is the arbiter and it also has a stratum level of 2. Further, Server D (906) has a stratum level of 2 and Server E (908) has a stratum level of 3.

Figure 10:
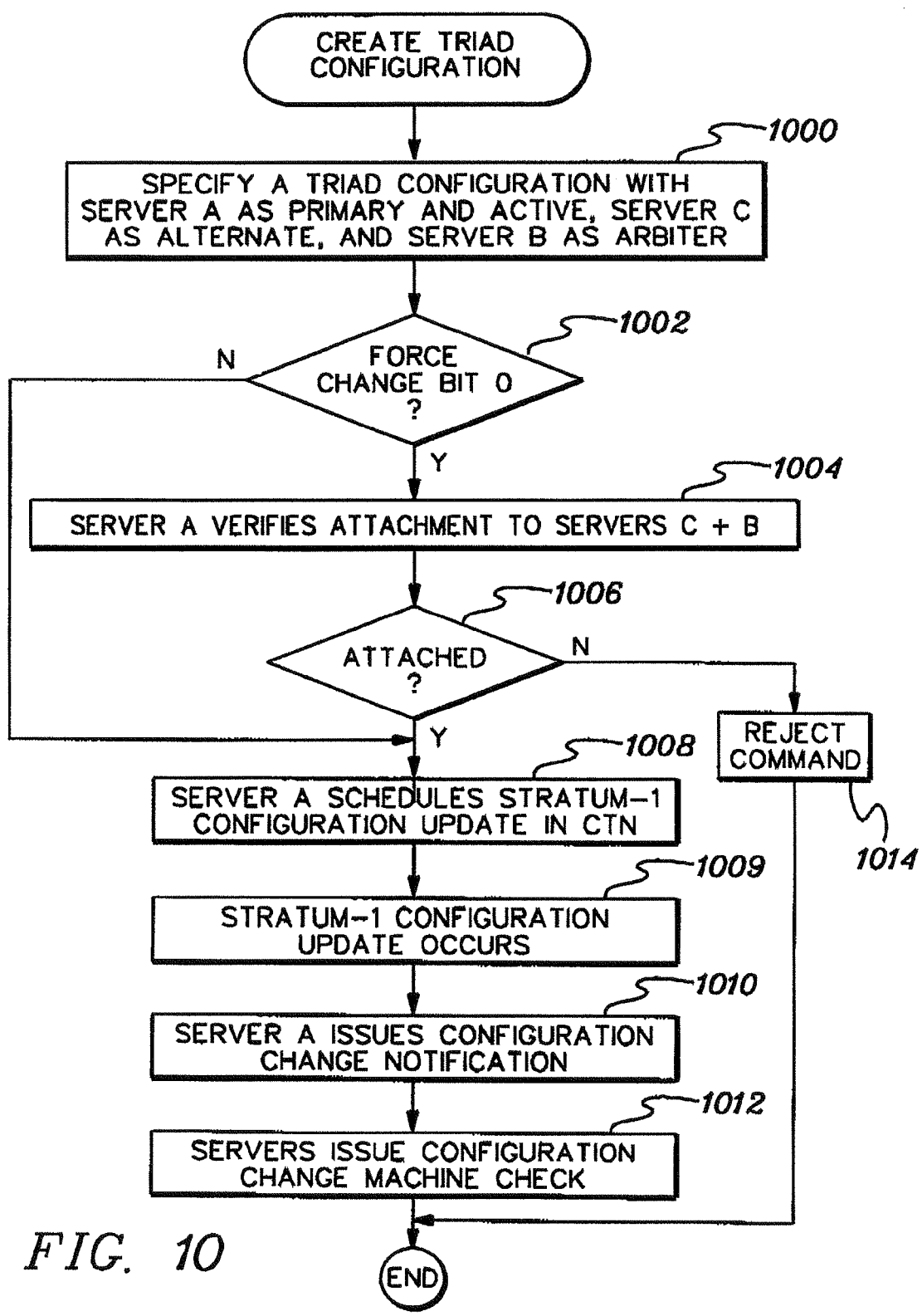
FIG. 10 depicts one embodiment of the logic associated with creating a triad configuration, in accordance with an aspect of the present invention.

One embodiment of the logic associated with creating a triad configuration is described with reference to FIG. 10. Initially, the console issues, for example, a modify stratum-1 configuration command to Server A specifying a triad configuration, in which Server A is the active primary stratum-1 server, Server C is the alternate stratum-1 server, and Server B is the arbiter, STEP 1000.

Thereafter, a determination is made as to whether the force change bit in the modify stratum-1 configuration command is set to 0, INQUIRY 1002. If it is set to 0, then Server A verifies that it is directly attached to Servers C and B, STEP 1004. If Server A is attached to Servers C and B, INQUIRY 1006, then Server A schedules a stratum-1 configuration update in the CTN, STEP 1008, and the update occurs, STEP 1009. Server A also issues a configuration change notification command to the console, in response to the new stratum-1 configuration becoming current, STEP 1010. Thereafter, the servers issue a configuration change machine check, when the new stratum-1 configuration becomes current, STEP 1012.

Returning to INQUIRY 1002, if the change bit is equal to one, then the connectivity verification is not performed, and processing continues with STEP 1008, in which Server A schedules a stratum-1 configuration update in the CTN.

Further, if connectivity verification fails, INQUIRY 1006, then the command is rejected, 1014, and processing completes.

As described above, in creating a non-null configuration, various commands are utilized. One such command is a modify stratum-1 configuration command, which is used to specify a change to the stratum-1 configuration for the CTN. The command request includes a new stratum-1 configuration information block that specifies how the stratum-1 configuration is to be modified.

Figure 11A:
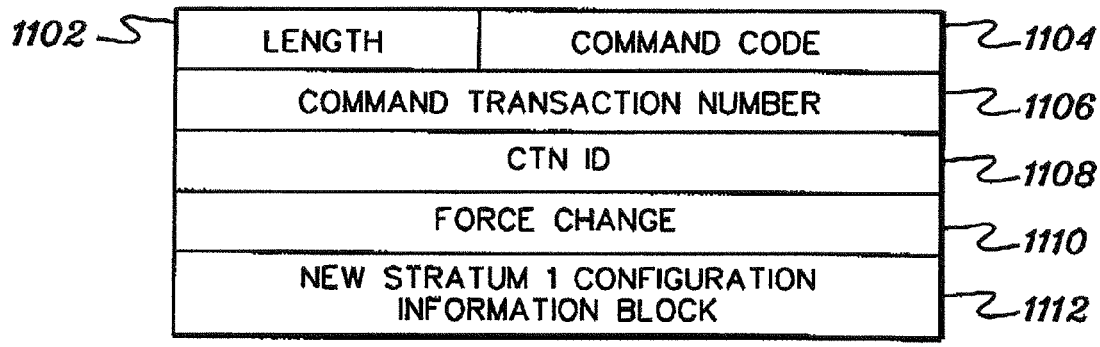
FIG. 11A depicts one embodiment of a modify stratum-1 configuration request block, in accordance with an aspect of the present invention.

One embodiment of a modify stratum-1 configuration command request block 1100 is described with reference to FIG. 11A. In one example, the modify stratum-1 configuration command request block includes the following fields:

a) Length Field 1102: This field indicates the length of this request block.

b) Command Code 1104: This field specifies the modify stratum-1 configuration command.

c) Command Transaction Number 1106: This field includes a value that is associated with the command being issued. The command transaction number is returned in the response block for the command.

d) CTN ID 1108: This field includes the CTN ID of the CTN targeted for the command.

e) Force Change (F) 1110: This field indicates whether configuration verification is to be performed for the command.

f) New Stratum-1 Configuration Information Block 1112: This field includes the new stratum-1 configuration information block for the CTN.

Figure 11B:
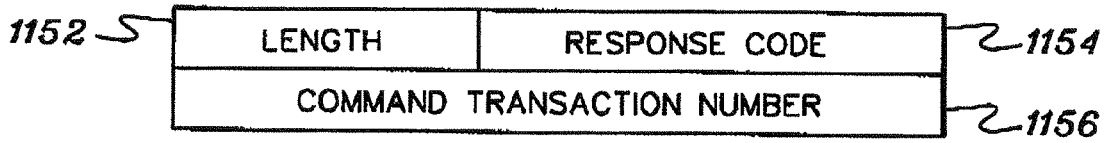
FIG. 11B depicts one embodiment of a modify stratum-1 configuration response block, in accordance with an aspect of the present invention.

One embodiment of a response block for the modify stratum-1 configuration command is described with reference to FIG. 11B. Modify stratum-1 configuration response block 1150 includes, for instance, the following fields:

a) Length 1152: This field includes the length of the command response block.

b) Response Code 1154: This field includes the response code for the command.

c) Command Transaction Number 1156: This field includes the value provided in the command transaction number field of the command request block.

In operation, when the command specifies a new active stratum-1 server for the CTN, the command is issued to the server designated as the active stratum-1 server in the NSCIB. If it is not issued to that server, a global command reject response code is returned. The new active stratum-1 server asynchronously issues a configuration change notification command after the update has taken effect within the CTN. When the command is issued to a server in a mixed CTN, the STP migration (S) field in the NSCIB is set to one. This field indicates that the stratum-1 configuration is to take effect when the CTN configuration changes from a mixed CTN to an STP-only configuration.

The command request block includes a field to indicate whether configuration verification is to be performed for the command. The force change field is set to, for instance, 1 to indicate that the command is to be performed without configuration verification. The force change field is set to, for instance, 0 to indicate that the following configuration verification checks are to be performed before the command is accepted:

If a non-null configuration is specified, verify that the receiving server is not a stratum-0 server. The force change field is to be set to 1 to set a stratum-0 server to the active stratum-1 server.

If a dual configuration is specified, the receiving server verifies the following:
If the receiving server is designated as the primary stratum-1 server, it ensures that it is attached to the alternate stratum-1 server.
If the receiving server is designated as the alternate stratum-1 server, it ensures that it is attached to the primary stratum-1 server.

If a triad configuration is specified, the receiving server verifies the following:
If the receiving server is designated as the primary stratum-1 server, it ensures that it is attached to the alternate stratum-1 server and arbiter server.
If the receiving server is designated as the alternate stratum-1 server, it ensures that it is attached to the primary stratum-1 server and arbiter server.

If the verification checks fail, the command is not accepted and a response code is reported.

Another command mentioned above is the configuration change notification (CCN) command. The configuration change notification command is used to notify the console of certain configuration changes in the CTN. The command is issued by the servers of the network after the configuration has taken effect in the CTN. The command is issued for the following configuration parameter changes, as examples: Stratum-1 configuration change; stratum-1 configuration change and CTN ID change; and/or CTN ID change.

The configuration changes occur as the result of a modify stratum-1 configuration command, a global modify CTN ID command or as the result of CTN recovery actions that cause a change in the active stratum-1 server for the CTN.

Figure 12A:
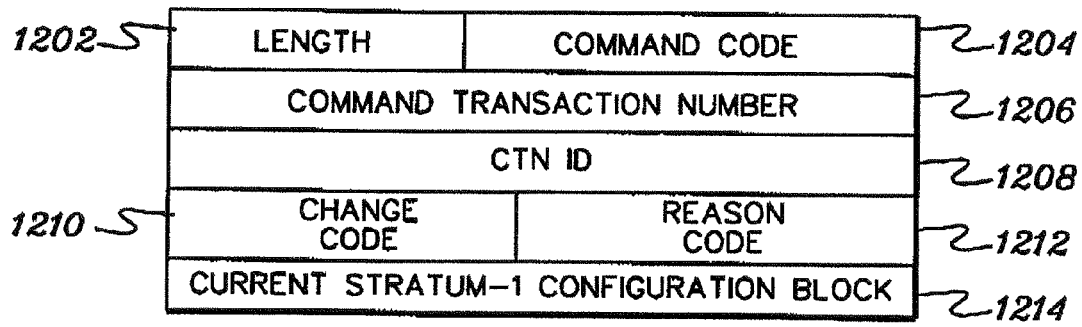
FIG. 12A depicts one embodiment of a configuration change notification request block, in accordance with an aspect of the present invention.

One example of a command request block 1200 for the configuration change notification command is described with reference to FIG. 12. In one embodiment, command request block 1200 includes the following:

a) Length 1202: This field includes the length of the command block.
b) Command Code 1204: This field includes a specification of the configuration change notification command.
c) Command Transaction Number 1206: This field includes a value that is associated with the command being issued. The command transaction number is returned in the response block for the command.
d) CTN ID 1208: This field includes the CTN ID of the server sending the command.
e) Change Code: This field includes a code that specifies the configuration changes that are being reported. This field indicates, for instance:
Stratum-1 configuration change: The stratum-1 configuration has changed as indicated by the current stratum-1 configuration block.
Stratum-1 configuration change and CTN ID change: The stratum-1 configuration and CTN ID has changed as indicated by the current stratum-1 configuration block and CTN ID field.
CTN ID only change: The CTN ID has changed as indicated by the CTN ID field.
f) Reason Code: This field includes a code that specifies the reason a stratum-1 configuration change is being reported. This field is valid when a stratum-1 configuration change is being indicated in the change code and indicates one of the following, as examples:
Modify stratum-1 configuration: The stratum-1 configuration change is the result of a modify stratum-1 configuration command.
Recovery: The stratum-1 configuration change is the result of an STP facility recovery action.
g) Current Stratum-1 Configuration Information Block: This field includes the current stratum-1 configuration information block for the server.

Figure 12B:
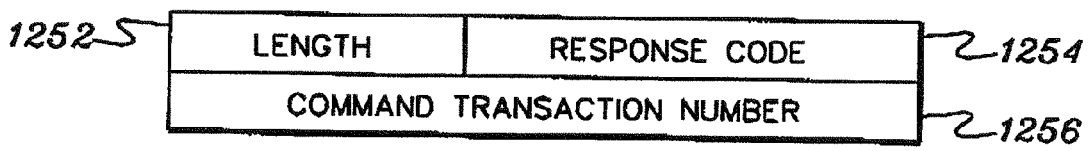
FIG. 12B depicts one embodiment of a configuration change notification response block, in accordance with an aspect of the present invention.

One embodiment of a command response block 1250 for the configuration change notification command is described with reference to FIG. 12B. In one example, command response block 1250 includes the following:

a) Length 1252: This field specifies a command response block length.
b) Response Code 1254: This field includes the response code for the command.
c) Command Transaction Number 1256: This field includes the value provided in the command transaction number field of the command request block.

Another command that can be performed is the modify CTN ID command, which is used to perform a local or global CTN ID change. The command can be used to modify the STP network ID component of the CTN, the ETR network ID component or both components of the CTN ID. Validity indicators in the request block indicate which components of the CTN ID are to be modified. The global command parameter in the request block specifies whether the command is a global command or a local command.

Figure 13A:
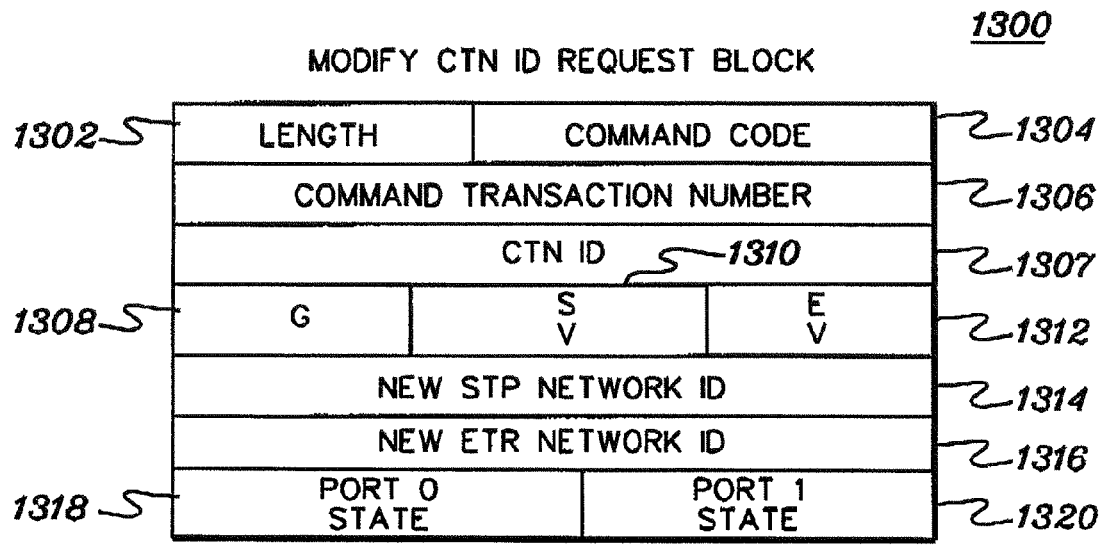
FIG. 13A depicts one embodiment of a modify CTN ID request block, in accordance with an aspect of the present invention.

One example of a command request block 1300 for the modify CTN ID command is described with reference to FIG. 13A. Modify CTN ID request block 1300 includes, for instance:

a) Length 1302: This field includes a command block length.
b) Command Code 1304: This field specifies the modify CTN ID command.
c) Command Transaction Number 1306: This field includes a value that is associated with the command being issued. The command transaction number is returned in the response block for the command.
d) CTN ID 1307: This field, when valid, includes the CTN ID of the CTN targeted for the command. The CTN ID is valid when the global CTN update indicator is, for instance, 1 and is to match the current CTN ID at the receiving server; otherwise, a CTN ID mismatch error is recognized. When the global CTN update indicator is, for instance, 0, this field is not valid and is ignored.
e) Global CTN Update (G) 1308: This field indicates whether the command is a global or local update. When the command is a local update, it is performed only at the receiving server. When the command is a global command, the command is to be issued to the active stratum-1 server.
f) New STP Network ID Valid (SV) 1310: This field indicates whether the new STP network ID field is valid. When it is not valid, the STP network ID portion of the CTN ID is not modified by the command.
g) New ETR Network ID Valid (EV) 1312: This field indicates whether the new ETR network ID field is valid. When it is not valid, the ETR network ID portion of the CTN ID is not modified by the command.
h) New STP Network ID 1314: When the SV indicator is valid, this field includes the new STP network id.

i) New ETR Network ID 1316: When the EV indicator is valid, this field includes the new ETR network ID.

j) ETR Port 0 Manual Port State 1318: When the EV indicator is valid, this field includes a manual port state code that specifies the intended state of ETR Port 0.

k) ETR Port 1 Manual Port State 1320: When the EV indicator is valid, this field includes the manual port state code that specifies the intended state of ETR Port 1.

Figure 13B:
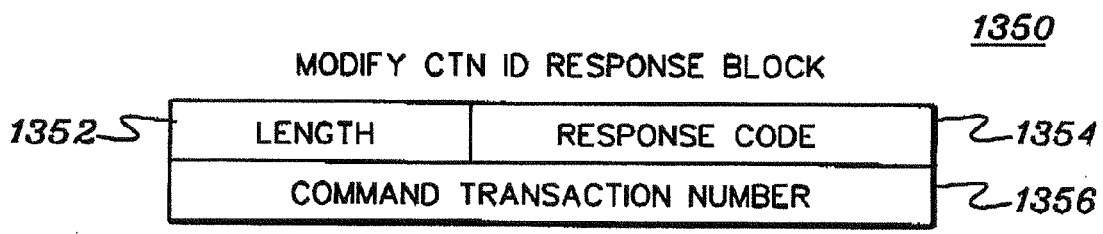
FIG. 13B depicts one embodiment of a modify CTN ID response block, in accordance with an aspect of the present invention.

One embodiment of a command response block 1350 for a modify CTN ID command is described with reference to FIG. 13B. In one example, modify CTN ID command response block 1350 includes, for instance, the following:

a) Lengths 1352: This field includes a value specifying a command response block length.

b) Response Code 1354: This field includes the response code for the command.

c) Command Transaction Number 1356: This field includes the value provided in the command transaction number field of the command request block.

In one example, when the modify CTN ID is issued as a local CTN update, the STP facility performs the update immediately, and a configuration change notification command is not issued to the console. Further, when the modify CTN ID is issued as a global CTN update, the active stratum-1 server issues the configuration change notification command to the console when the update becomes current.

When the modify CTN ID is issued as a global CTN update, the STP facility performs the CTN parameter update procedure to schedule a modify CTN operation at the servers in the CTN. The scheduled update time is set to a value that guarantees the servers in the CTN receive the update information prior to the scheduled update time. A specified response code indicates that the operation was successfully scheduled in the CTN.

When the update is scheduled at a server, the server stores the scheduled parameter update information onto console disk storage. Additionally, when the parameter update becomes current at a server, the server stores the updated CTN parameters onto console disk storage.

As an example, a command, referred to as a save CTN parameters command, is issued by the server to store the information. The command includes a request block having, for instance, length and command code fields, as well as a command transaction number; a CIIB; an STP facility enabled indicator that indicates whether the STP facility is enabled; a local clock source indicator that specifies whether the server has been designated as the local clock server; an active oscillator indicator that identifies the oscillator that is active at the time of the save command; an NCIIB; an SCIB; a stratum-1 based steering rate that includes a base steering rate for the server when it is operating as a stratum-1 server; a NSCIB; a PCSIB; a TCPIB; a LSOIB; a save timestamp that indicates the time the save command was issued; an oscillator identifier 0; a computed oscillator skew 0; an oscillator identifier 1; and a computed oscillator skew 1 field. Many of these fields are described below with reference to FIG. 14B. A command response block for the command includes, for instance, a length, a response code, and command transaction number.

A local CTN ID change occurs at a server as the result of the modify CTN ID console command issued as a local command. The server receiving the modify CTN ID console command, in one example, immediately (in one example) makes a specified change to the CTN ID at the server and puts all established STP paths on the server into the uninitialized state, and then establishes initiative to perform initialization on the STP lengths. A configuration change machine check condition is generated when the CTN ID change occurs.

A global CTN ID update occurs at a server at the CTN ID update time specified in the new CTN ID block. The server makes the change to its CTN ID at the specified update time. Following the change, the server does not recognize CTN ID mismatch errors that occur as a result of mismatch between the new CTN ID and the former CTN ID values for a period equal to the sync check threshold. CTN ID mismatch errors that occur as a result of the mismatch other than between the new CTN ID and the old CTN ID values are not ignored during this period. A configuration change machine check condition is generated when the CTN ID change occurs.

The active stratum-1 server issues a configuration change notification console command after making a CTN ID update that occurs as a result of the global CTN ID update.

In addition to the above-described commands, the STP console interface includes commands to read STP timing and configuration information from a server. The information provided in the read commands is made available to use via console displays. One example of a command request block 1400 for a read CTN parameters command is described with reference to FIG. 14A. In one example, read CTN parameters command request block 1400 includes, for instance:

a) Length 1402: This field includes a value specifying a command block length.

b) Command Code 1404: This field includes a value specifying the read CTN parameters command.

c) Command Transaction Number 1406: This field includes a value that is associated with the command being issued. The command transaction number is returned in the response block for the command.

One embodiment of command response block 1450 for the read CTN parameters command is described with reference to FIG. 14B. In one example, response block 1450 includes the following:

a) Length 1452: This field is used to indicate a command response block length.

b) Response Code 1454: This field includes the response code for the command.

c) Command Transaction Number 1456: This field includes the value provided in the command transaction number field of the command request block.

d) CTN ID Information Block 1458: This field includes the CTN ID information block (CIIB) for the server.

In one embodiment, the CTN ID information block includes the CTN ID for the server, and codes that specify the state of ETR ports 0 and 1, in a non-null ETR network.

e) Maximum STP Version 1460: This field includes a value that indicates the maximum STP version number supported by the server.

f) Active STP Version 1462: This field includes a value that indicates the STP version number that is currently active at the server.

g) Maximum Timing Stratum Level 1464: This field includes a value that specifies the maximum stratum level that a server can be set at and be in the synchronized state. A server with a stratum level greater than the maximum timing stratum level is in the unsynchronized timing state and the not-usable clock source state.

h) Maximum Stratum Level 1466: This field includes a value that specifies the maximum stratum level that can be set for any server in the CTN.

i) Local Clock Source (L) 1468: This field specifies whether the server has been designated as a local clock server.

j) STP Clock Source State (C) 1470: This field specifies the clock source state for the server. The STP clock source state indicates whether a usable STP clock source is available. The STP clock source is used to determine the coordinated server time (CST) required to be able to synchronize the TOD clock.

Not Usable: The not usable STP clock source state indicates that a usable STP clock source is not available to the STP facility. When a usable STP clock source is not available, CST cannot be determined.

Usable: The usable STP clock source state indicates that a usable STP clock source is available to the STP facility. When a usable STP clock source is available, CST has been determined and can be used to synchronize the TOD clock to the STP network.

k) Active Oscillator (A) 1472: This field identifies the oscillator that is considered to be active by the STP facility.

l) Timing Mode (TMD) 1474: This field specifies the timing mode of the server. The timing mode specifies the technique by which the TOD clock is maintained for purposes of synchronization within a timing network. A TOD clock operates in one of the following timing modes, as examples:

Local Timing Mode: When the configuration is in local timing mode, the TOD clock has been initialized to a local time and is being stepped at the rate of the local hardware oscillator. The configuration is not part of a synchronized timing network.

ETR Timing Mode: When the configuration is in ETR-timing mode, the TOD clock has been initialized to the ETR and is being stepped by stepping signals from ETR.

STP Timing Mode: When the configuration is in STP-timing mode, the TOD clock has been initialized to coordinated server time (CST) and is being stepped at the rate of the local hardware oscillator. In STP timing mode, the TOD clock is steered so as to maintain, or attain, synchronization with CST.

m) STP Timing State (TST) 1476: This field specifies the timing state at the server. The timing state indicates the synchronization state of the TOD clock with respect to the timing network reference time.

Synchronized State: When a configuration is in the synchronized timing state, the TOD clock is in synchronization with the timing network reference time as defined below.
If the configuration is in ETR-timing mode, the configuration is synchronized with the ETR.
If the configuration is in STP timing mode, the configuration is synchronized with coordinated server time (CST).

A configuration that is in the local timing or uninitialized timing mode is not in the synchronized state.

Unsynchronized State: When a configuration is in the unsynchronized timing state, the TOD clock is not in synchronization with the timing network reference time as defined below:
If the configuration is in ETR-timing mode, the configuration has lost synchronization with the ETR.
If the configuration is in STP timing mode, the configuration has lost or has not been able to attain synchronization with coordinated server time (CST). The configuration is out of synchronization with CST when the TOD clock differs from CST by an amount that exceeds a model dependent STP-sync-check-threshold value.

Stopped State: When a configuration is in the stopped state, the TOD clock is either in the stopped state or TOD clock recovery is in progress. After TOD clock recovery completes, the TOD clock enters either the synchronized or unsynchronized state.

n) CTN Type (CTNT) 1478: This field includes a code that specifies the type of timing network that is configured at the server. Example types include:
No CTN defined: the server is not configured for attachment to a CTN.
STP-only timing network: the server is configured for attachment to a CTN that includes an STP network only.
Mixed timing network: the server is configured for attachment to a CTN that includes both an STP network and an ETR network.

o) Stratum 1480: This field includes a value indicating the stratum level of the server.

p) New CTN ID Information Block (NCIIB) 1482: This field includes the new CIIB for the server. The new CTN ID update time is stored in UTC (Universal Time, Coordinated) format.

In one example, the new CTN ID information block includes a new CTN ID; ETR port 0 manual port state; ETR port 1 manual port state; and a new CTN ID update time, which is, for instance, a timestamp indicating the time at which the new CTN ID is to become current.

q) Current Stratum-1 Configuration Information Block (SCIB) 1484: This field includes the current stratum-1 configuration block for the server.

r) New Stratum-1 Configuration Information Block (NSCIB) 1486: This field includes the new stratum-1 configuration block for the server.

s) PRT (Primary Reference Time) Correction Steering Information Block (PCSIB) 1488: This field includes the PCSIB for the server.

In one example, the PRT Correction Steering Information Block includes the following:
1. PRT Correction Steering Rate Start Time: This field includes a timestamp indicating the time at which PRT-correction steering is to be initiated.
2. PRT Source Identifier: This field includes the primary reference time source identifier.
3. Console Dispersion: This field includes a provided console dispersion.
4. UTC Dispersion: This field includes a provided UTC dispersion.
5. PRT Offset: This field includes a provided primary reference time offset.
6. PRT Timestamp: This field includes a timestamp that corresponds to a provided PRT timestamp.

t) Timezone Control Parameter Information Block (TCPIB) 1490: This field includes the TCPIB for the server. The new TZIB update time and new DST offset update time are converted to UTC timestamp format.

In one example, the Timezone Control Parameter Information Block includes, for instance, the following:
1. Active Local Time Code: This field includes a value that identifies whether a local time setting is in effect for the CTN and if so, how that value is obtained. Examples include:
No local time specified. The time zone offset and DST offset are both zero.
ATZIB valid with automatic updates—the ATZIB is valid and specifies the local time settings for the CTN. The active DST offset, new DST offset and new DSTO update time fields in the TCPIB are valid and are set based on the DST-on and DST-off algorithms in the ATZIB. The TTO field is not valid.

ATZIB valid without automatic updates—the ATZIB is valid and specifies the time zone offset for the CTN. Any DST-on and DST-off algorithms specified in the ATZIB are not used. The active-DST offset, new DST offset and new DSTO update time fields are valid. The set DST offset console command is used to modify the new DSTO update time and to specify whether the local time is to be in standard time or DST when the update becomes current. The TTO field is not valid.

TTO field valid—the TTO field is valid and specifies the local time offset of the CTN and includes both the time zone offset and any daylight savings time offset. The ATZIB, active DST offset, new DST offset and new DSTO update time fields are not valid.

2. New Local Time Code: This field includes a value that identifies whether a new TZIB is pending for the CTN. Examples include:
   No new local time specified.
   NTZIB valid with automatic updates—the NTZIB and NTZIB update time fields are valid and specify the new time setting for the CTN. The new TZIB becomes current at the new TZIB update time. The active DST-offset, new DST-offset and new DSTO update times are set based on the DST-on and DST-off algorithms provided in the NTZIB when the NTZIB becomes current.
   NTZIB valid without automatic updates—the NTZIB and NTZIB update time fields are valid and specify the time zone and DST offsets that are to become current at the new TZIB update time. The DST-on and DST-off algorithms specified in the TZIB are not used.

3. New TZIB DST (D): This field is valid when the new local time code is equal to a value representing TZIB-valid-without-automatic DST-updates and indicates whether the local time for the CTN should be set to daylight savings time when the NTZIB becomes current or whether it should be set to standard time when the NTZIB becomes current.

4. Total Time Offset: This field, when valid, specifies the total time offset that is in effect at the STP facility as the result of a DST offset and time zone offset that is in effect at the server. The field is valid when the active time code specifies the TTO field.

5. Active Time Zone Information Block (ATZIB): This field includes the time zone information block (TZIB) currently in effect at the server.

In one example, a TZIB includes:
   aa) Time Zone Algorithm Number: This field identifies the time zone algorithm number for this entry.
   bb) Time Zone Offset: This field includes a value indicating the time zone difference from UTC.
   cc) Daylight Savings Time (DST) Offset: This field includes a value indicating the DST offset that is to be applied when daylight savings time is in effect. The time and date at which the DST offset value is to be active for the CTN is specified by the DST-on algorithm. The time and date at which the DST offset for the server is to be set to zero is specified by the DST-off algorithm.
   dd) Standard Time Name: This field identifies the time zone when the DST offset is not in effect.
   ee) Daylight Savings Time Name: This field identifies the time zone when the DST offset is in effect.
   ff) DST-On Time Algorithm: This field specifies the algorithm to be used for calculating the date and time at which the DST offset is to be applied. The offset is applied automatically when automatic DST scheduling is in effect for the server.
   gg) DST-Off Time Algorithm: This field specifies the algorithm to be used for calculating the date and time at which the DST offset is to be removed. The offset is removed automatically when automatic DST scheduling is in effect for the server.

6. New Time Zone Information Block (NTZIB) This field, when valid, includes the time zone information block that is to replace the ATZIB beginning at the time specified by the NTZIB update time.

7. Active Daylight Savings Time Offset (DSTO): This field includes a value indicating the DST offset currently in effect at the server.

8. New Daylight Savings Time Offset (NDSTO): This field includes a value that specifies the offset that is to replace the active DSTO beginning at the time specified by the new DSTO update timestamp.

9. New TZIB Update Time: This field includes a timestamp that specifies the time at which the new TZIB is to take effect.

10. New DSTO Time: This field includes a timestamp that specifies the time at which the new DST offset is to take effect.

u) Leap Seconds Offset Information Block (LSOIB) 1492: This field includes the LSOIB for the server. The new LSO update time is converted to UTC timestamp format.

In one example, the Leap Seconds Offset Information Block, includes, for instance, the following:
   1. Active Leap Second Offset Provided (P): This field, when set to, for instance, one, indicates that the active leap seconds offset includes a value that has been provided by the operator. When the field is, for instance, zero, the active leap seconds offset includes the machine initialization value and has not been set by the operator.
   2. Active Leap Second Offset (LSO): This field includes a value indicating the number of leap seconds that are currently in effect at the STP facility.
   3. New Leap Second Offset (LSO): This field includes a value indicating the number of leap seconds that are to become active at the time specified by the LSO update time.
   4. New Leap Second Offset (LSO) Update Time: This field includes a timestamp that specifies the time at which the new leap seconds offset is to take effect.

v) Oscillator Identifier 0 (1494): This field includes an identifier for oscillator 0.

w) Computed Oscillator Skew 0 (COS0) 1496: This field includes a value that specifies the computed skew relative to nominal frequency for oscillator 0 installed on the server.

x) Oscillator Identifier 1 (1498): This field includes an identifier for oscillator 1.

y) Computed Oscillator Skew 1 (COS1) 1499: This field includes a value that specifies the computed skew relative to nominal frequency for oscillator 1 installed on the server.

The above information is used, in one aspect of the present invention, to ensure the integrity of the servers of the coordinated timing network. This information is propagated to the servers of the network. The servers of the network obtain the configuration, understand the configuration and follow the same configuration. In one embodiment, a server cannot operate for more than a prespecified amount of time (e.g., freewheel period) without knowing the stratum-1 configuration. If a server wishes to join the network, it obtains and uses this information. This information provides the state of the CTN, as well as additional information.

In accordance with a further aspect of the present invention, a capability is provided to configure an alternate server as part of the stratum-1 configuration for a coordinated timing network such that it is capable of taking over as the active stratum-1 server in the event of a failure at the active stratum-1 server. This prevents a single point of failure for the CTN, such that servers in a CTN can maintain or gain synchronization within the timing network despite a failure at the active stratum-1 server.

As described above, a stratum-1 configuration can be defined for a CTN that specifies a primary and alternate stratum-1 server. The primary server normally acts as the active stratum-1 server for the CTN with the alternate acting as a backup and is referred to as the inactive stratum-1 server. When the inactive stratum-1 server detects a failure at the active stratum-1 server, it notifies the CTN (via, for instance, a CTN parameter update procedure) that it has taken over as the active stratum-1 server of the CTN and drives the CTN based on its own time of day clock. The failing stratum-1 server is set to stratum-0 and may rejoin the network after recovery, but not as the stratum-1 server, in this embodiment. Further, in one embodiment, if the primary server does rejoin the CTN as the stratum-2 server, it assumes the role of the backup stratum-1 server. The console may instruct the primary server to resume its role as the active stratum-1 server for the CTN, if desired.

Figure 15:
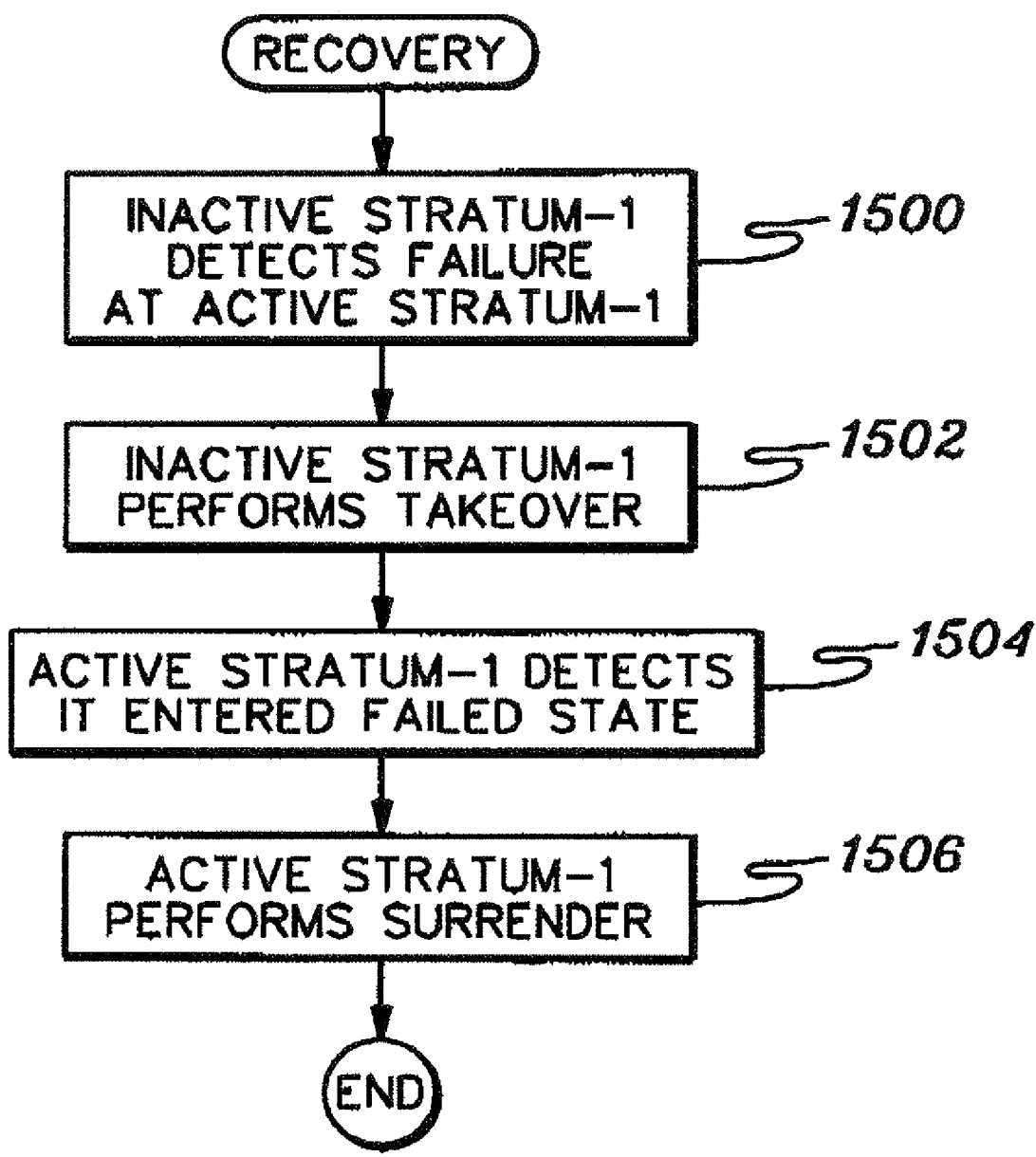
FIG. 15 depicts one embodiment of the logic associated with performing recovery of a failed active stratum-1 server, in accordance with an aspect of the present invention.

One embodiment of the logic associated with detecting a failure at the active stratum-1 server and performing recovery is described with reference to FIG. 15. Initially, the inactive stratum-1 server detects a failure at the active stratum-1 server, STEP 1500. There are various mechanisms for detecting a failure at the active stratum-1 server including, for instance, receipt of a stratum-1 system check signal (SCS); via console assisted recovery, which includes communication with the console to determine that the active stratum-1 server has entered a check stopped or powered off state; and through a triad recovery, which uses a third server, the arbiter server, to vote out the active stratum-1 server. These failure detection mechanisms are described in further detail below.

In response to detecting an active stratum-1 failure, the inactive stratum-1 server performs a takeover procedure, STEP 1502. Further, should the active stratum-1 server detect it has entered a failure state, STEP 1504, it performs a surrender procedure to give up its role as active stratum-1 server for the CTN, STEP 1506.

As one example, STEPS 1500 and 1502, which are performed by the inactive stratum-1 server, may be performed substantially in parallel to STEPS 1504 and 1506, which are performed by the active stratum-1.

Further details regarding failure detection and error recovery are described below with reference to procedures that are based on the type of configuration. For instance, stratum-1 server recovery is performed only when an alternate stratum-1 server has been specified in the system-1 configuration of the CTN. An alternate is specified in both the dual server and triad configurations. Thus, a recovery procedure is provided for both the dual server stratum-1 configuration recovery and a triad stratum-1 configuration recovery, each of which is described below.

In a dual server stratum-1 configuration recovery, the inactive stratum-1 server in the dual server configuration takes over the role of the active stratum-1 server, in response to detecting an active stratum-1 failure. One embodiment of the logic associated with a dual server stratum-1 configuration recovery is described with reference to FIG. 16. Initially, the inactive stratum-1 server detects a failure at the active stratum-1 server, STEP 1600. An active stratum-1 failure is detected in a dual server configuration when, for instance, a console assisted recovery procedure is performed and indicates that an active stratum-1 failure has occurred, or a stratum-1 system check signal is recognized, each of which is described below.

In response to detecting the active stratum-1 server failure, the inactive stratum-1 server performs an active stratum-1 takeover procedure to take over the role of the active stratum-1 server for the CTN, STEP 1602. This concludes processing of the dual server stratum-1 configuration recovery.

Figure 17:
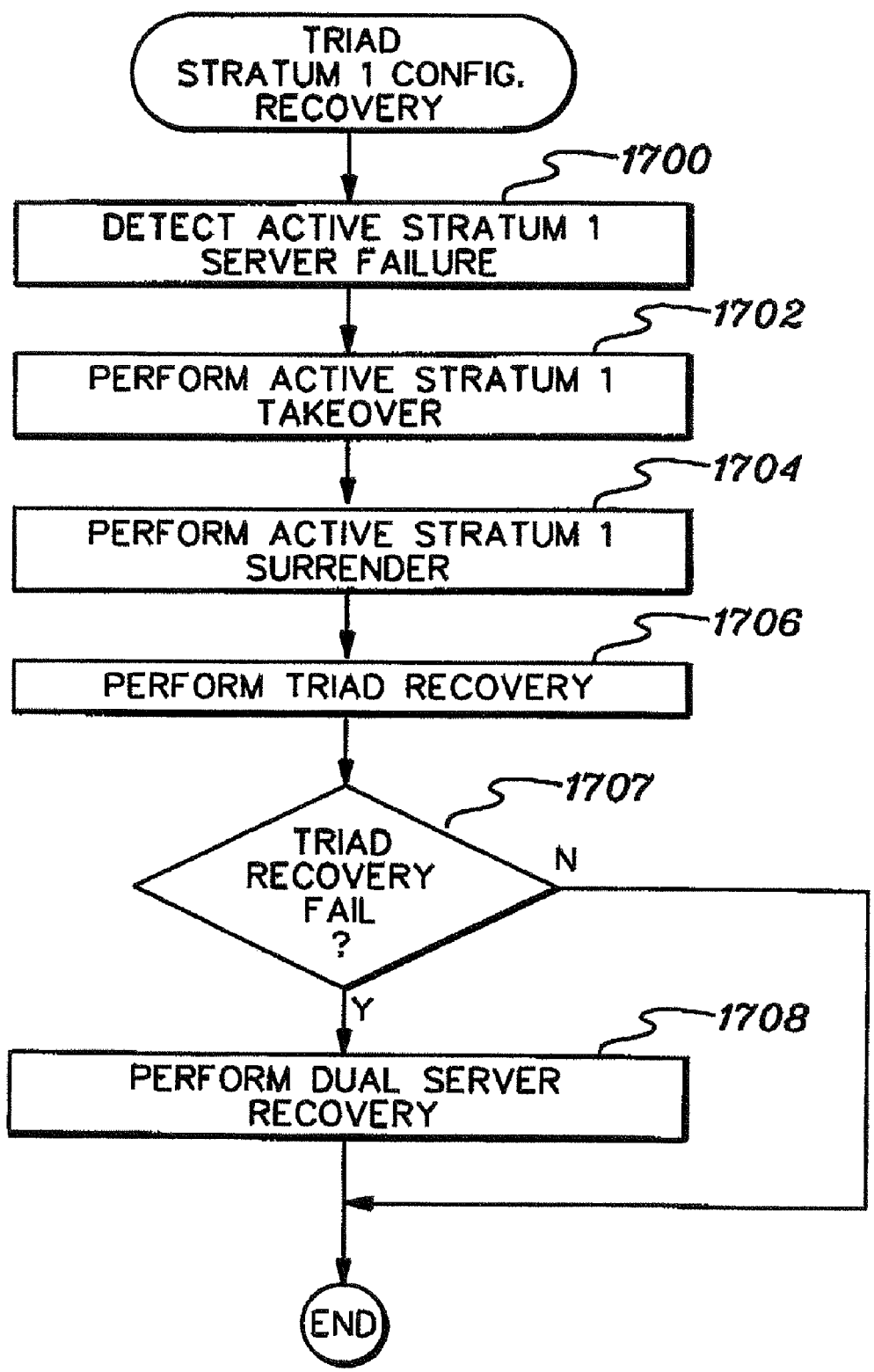
FIG. 17 depicts one embodiment of the logic associated with a triad stratum-1 configuration recovery procedure, in accordance with an aspect of the present invention.

In addition to the dual server stratum-1 configuration recovery, a triad stratum-1 configuration recovery is provided. One embodiment of the logic associated with the triad stratum-1 configuration recovery is described with reference to FIG. 17. Initially, the inactive stratum-1 server in a triad configuration recognizes an active stratum-1 failure, STEP 1700. As examples, the inactive stratum-1 server recognizes an active stratum-1 failure when a triad recovery procedure is performed and indicates that an active stratum-1 failure has occurred; or a console assisted recovery procedure is performed that indicates that an active stratum-1 failure has occurred.

In response to detecting an active stratum-1 failure, the inactive stratum-1 server performs an active stratum-1 takeover procedure to take over the role of the active stratum-1 server of the CTN, STEP 1702. Additionally, the active stratum-1 server gives up the role of active stratum-1 server, in response to detecting that it has lost attachment to both the inactive stratum-1 server and arbiter server, STEP 1704. The active stratum-1 server performs an active stratum-1 surrender procedure, described below, to give up the role of the active stratum-1 server of the CTN.

Moreover, the inactive stratum-1 server performs the triad recovery procedure, STEP 1706, when, for instance, the following conditions occur: the inactive stratum-1 server loses attachment to the active stratum-1 server and has attachment to the arbiter; and/or the inactive stratum-1 server recognizes an active stratum-1 communication timeout and has attachment to the arbiter. An active stratum-1 communication timeout is detected, for instance, two seconds prior to the expiration of a freewheel interval for the CTN and allows the stratum-1 takeover to occur prior to synch check conditions being detected in the CTN. Details regarding the freewheel interval are described in U.S. Ser. No. 11/468,352, entitled "Coordinated Timing Network Configuration Parameter Update Procedure," Carlson et al., filed Aug. 30, 2006, which is hereby incorporated herein by reference in its entirety.

Figure 16:
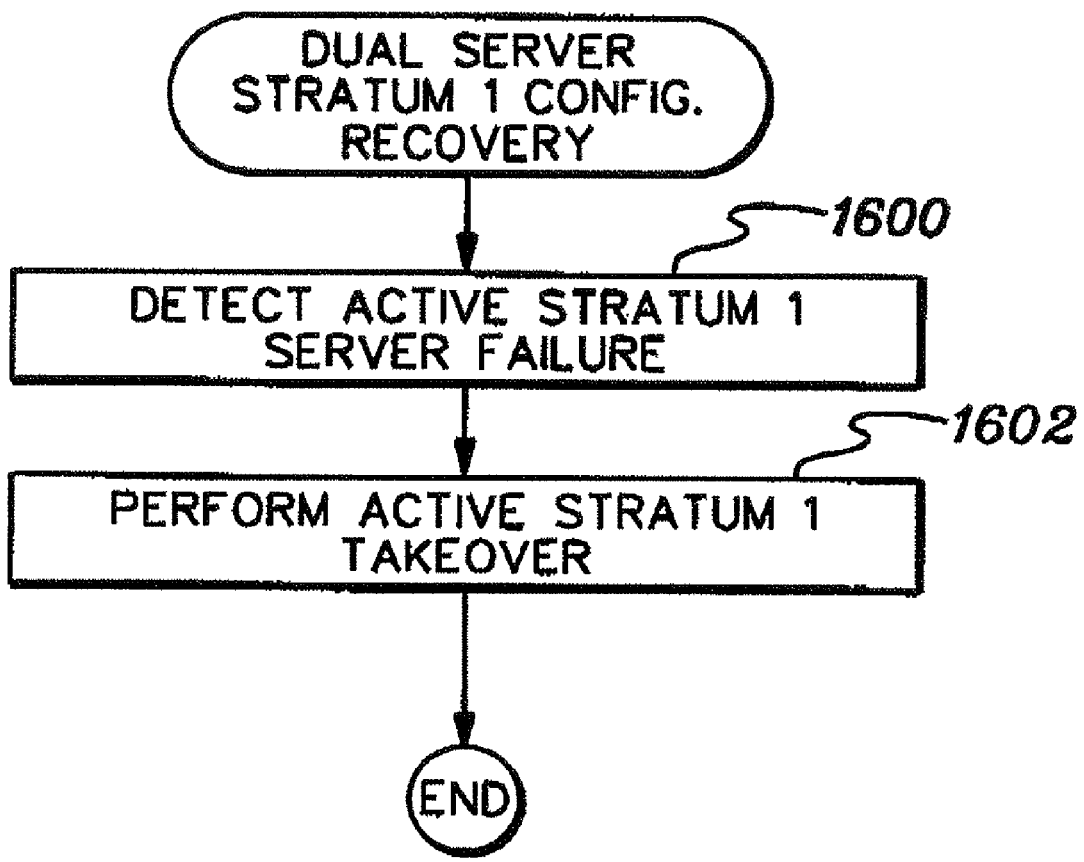
FIG. 16 depicts one embodiment of the logic associated with a dual server stratum-1 configuration recovery procedure, in accordance with an aspect of the present invention.

In one embodiment, should the triad recovery fail, INQUIRY 1707, the inactive stratum-1 server in a triad configuration performs a dual server recovery, as described with reference to FIG. 16, STEP 1708. However, if the triad recovery is successful, then dual server recovery is bypassed. This concludes processing of the triad stratum-1 configuration recovery.

Further details regarding various procedures performed during recovery are described in further detail below.

For instance, one mechanism for detecting a failure at the active stratum-1 server is receipt of a stratum-1 system check signal (SCS) at the inactive stratum-1 server. This stratum-1 system check signal indicates to the inactive stratum-1 server in a dual server CTN configuration that the active stratum-1 server has entered a state that prevents it from continuing to act as the active stratum-1 server for the CTN.

The inactive stratum-1 server recognizes the SCS, when it detects that the active stratum-1 server has terminated STP connectivity to the inactive stratum-1 server. The inactive stratum-1 detects that the active stratum-1 server has terminated STP connectivity when it receives an offline signal on the last path in the STP path group associated with the active stratum-1 server.

The active stratum-1 server recognizes that it has issued the SCS, when it terminates all connectivity to the inactive stratum-1 server. The active stratum-1 server considers that all STP connectivity to the inactive stratum-1 server to have been terminated, when it sends an offline signal on the last path in the STP path group associated with the inactive stratum-1 server.

Another mechanism for detecting failure is the console assisted recovery procedure, which is initiated by the inactive stratum-1 server in either a dual server or triad configuration to determine the state of the active stratum-1 server. This procedure makes use of information provided by the console to determine whether an active stratum-1 failure condition exists.

Figure 18A:
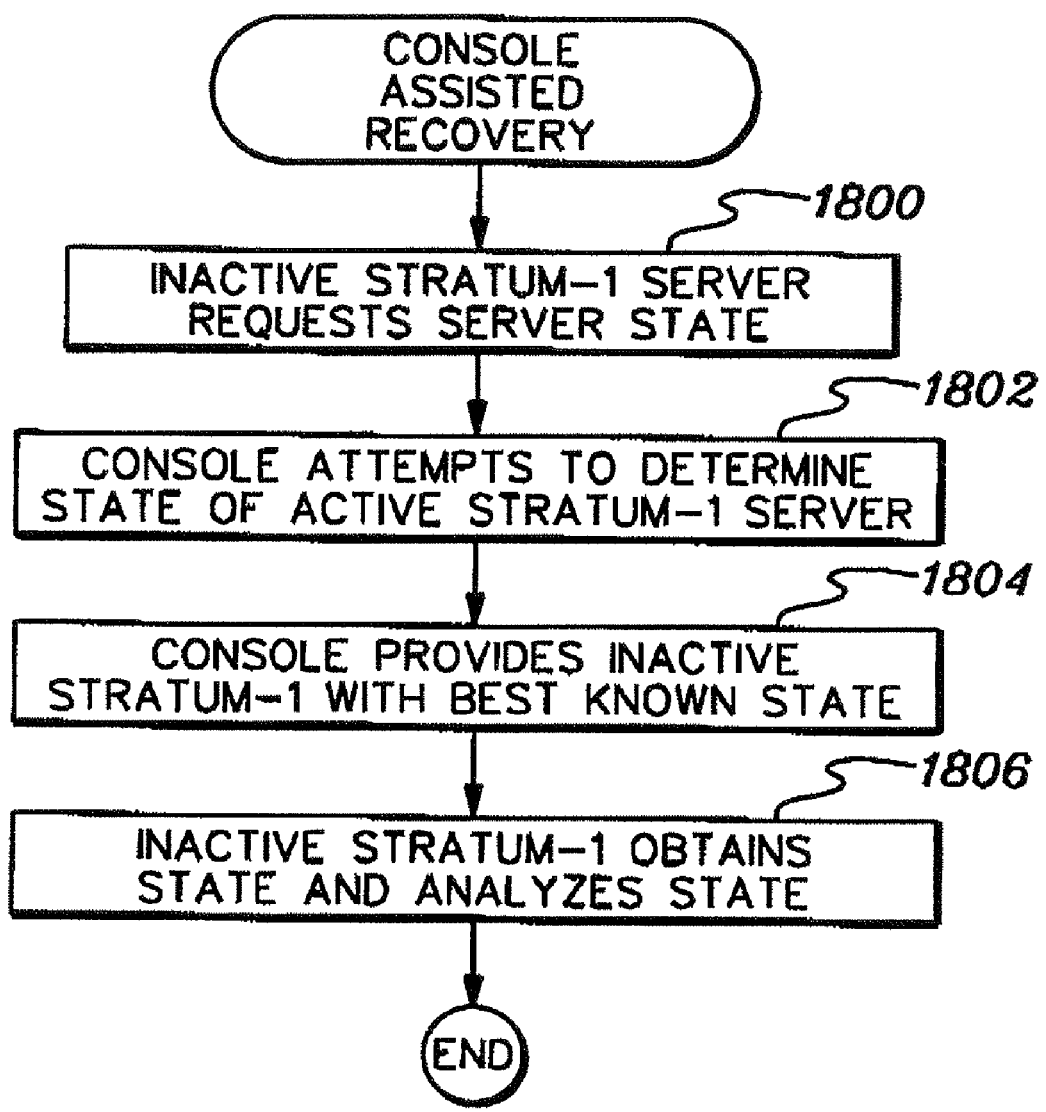
FIG. 18A depicts one embodiment of the logic associated with a console assisted recovery, in accordance with an aspect of the present invention.

One embodiment of the logic associated with a console assisted recovery procedure is described with reference to FIG. 18A. Initially, the inactive stratum-1 server requests server state, STEP 1800. In particular, the inactive stratum-1 server issues an STP generated request server state console command with the node descriptor field in the command request block equal to the node descriptor of the active stratum-1 server. In response to the console receiving this request, the console attempts to communicate with the active stratum-1 server to determine the state of the active stratum-1 server, STEP 1802.

After attempting to determine the state of the active stratum-1 server, the console issues a write server state console command to the inactive stratum-1 server with the state code in the request block set to the best known state of the active stratum-1 server, STEP 1804. If the inactive stratum-1 server receives a write server state console command indicating that the stratum-1 server is in the check stopped or power off state, it recognizes an active stratum-1 condition, STEP 1806.

Figure 18B:
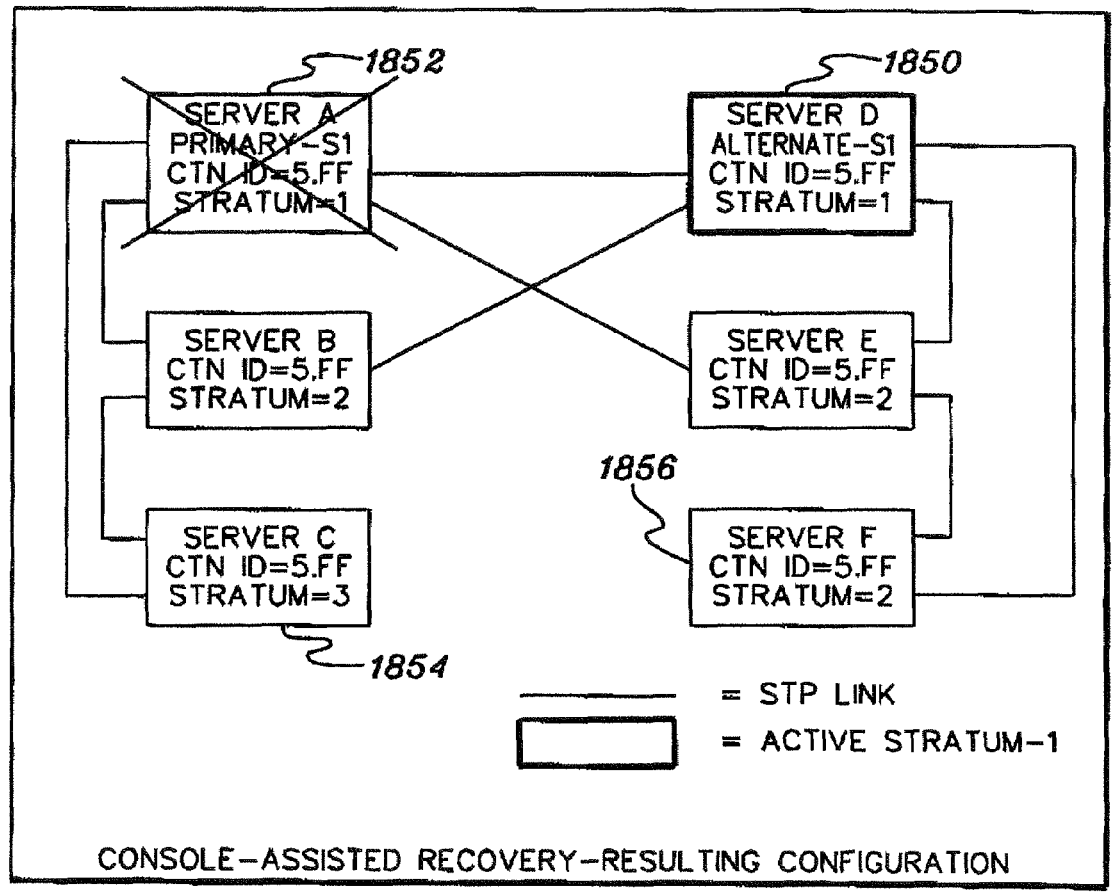
FIG. 18B pictorially depicts a console assisted recovery resulting configuration, in accordance with an aspect of the present invention.

Further details associated with one example of console assisted recovery are described with reference to the configuration depicted in FIG. 18B. As an example, in the dual server configuration, console assisted recovery is performed by the inactive stratum-1 server when it detects an attached server communication error with the active stratum-1 server. In the following example, the active stratum-1 server has entered the check state. The following actions are performed during the console assisted recovery for the configuration of FIG. 18B.

1. Server D (1850) detects loss of attachment to Server A (1852).
2. Server D issues the request server state command to the console to request the state of Server A.
3. The console queries Server A to determine its operating state.
4. The console issues a write server state to Server D indicating that Server A is either not operational (check-stopped or powered off) or the operational state is unknown.
5. If Server A is operational or its state is unknown, Server D repeats the request server state command.
6. If the state of Server A is not operational, Server D performs the CTN parameter update procedure to schedule a new stratum-1 configuration to set itself as the active stratum-1 server.

In one example, the Coordinated Timing Network parameter update procedure updates the CTN parameters simultaneously in the timing network. As one example, the procedure includes selecting one or more timing parameters to change and constructing an information response packet that includes the parameters to be changed as well as when the change is to occur. The packet is then broadcast to the other servers in the network. At the receiving server, it is determined whether or not communication with the clock source was lost. This is typically accomplished by the periodic receipt of a timing message from a node in the network that is used as the clock source. If it is determined that the loss of communication has persisted too long (which is defined ahead of time for the network and is a function of the maximum drift rate of the clock at a server with respect to the clock at that server's clock source, as an example), then the receiving server declares its timing parameters invalid. To proceed, the server acquires new timing parameters. If it has not been too long, the timing parameter is still valid and the parameter is updated at the suggested future time in all servers in the network.

7. When the stratum-1 configuration change takes effect, Server D issues a configuration change notification to the console.
8. Server C (1854) changes to stratum-3; Server F (1856) changes to stratum-2.
9. A configuration change machine check is generated at all the servers of the network to report the stratum-1 configuration change and the stratum level change for Servers C and F.

A further recovery procedure that is performed is the triad recovery procedure. The triad recovery procedure is performed by the inactive stratum-1 server in a triad configuration to determine whether a stratum-1 failure has occurred.

Figure 19A:
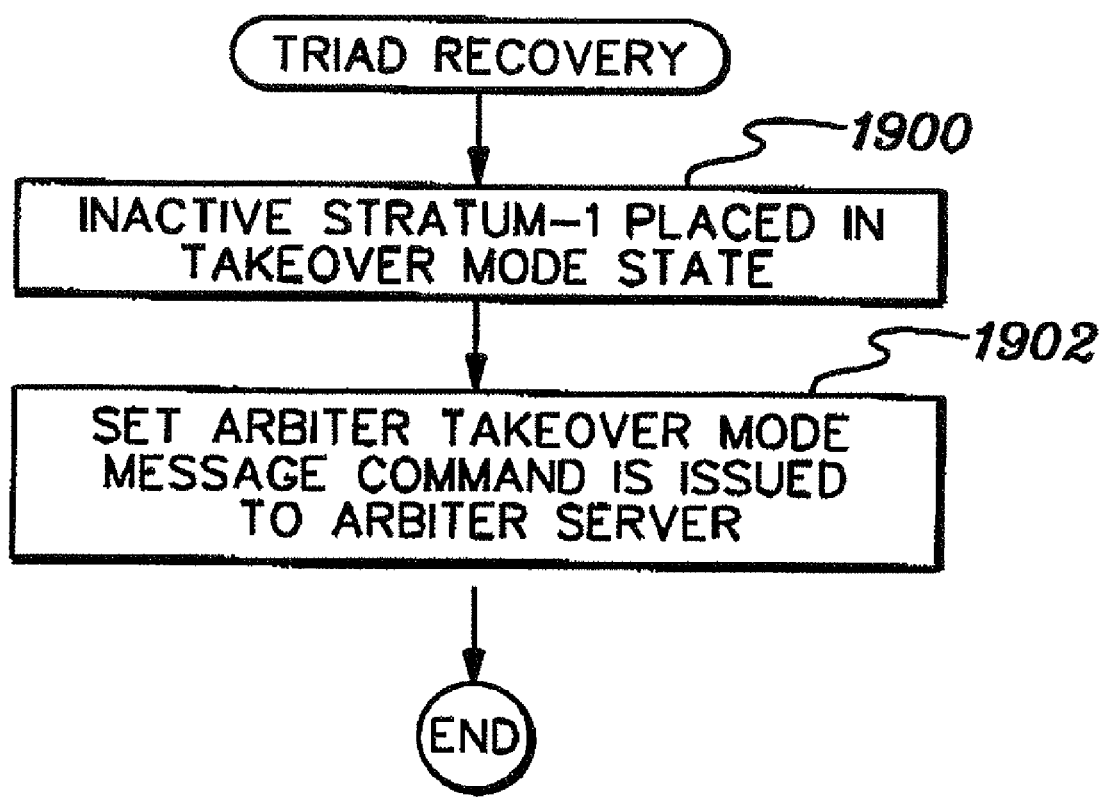
FIG. 19A depicts one embodiment of the logic associated with performing triad recovery, in accordance with an aspect of the present invention.

One embodiment of the logic associated with the triad recovery procedure is described with reference to FIG. 19A. Initially, the inactive stratum-1 server is put into the takeover mode state, STEP 1900. Further, a set arbiter takeover mode message command is issued to the arbiter server, STEP 1902. The set arbiter takeover mode operation is issued, via, for instance, a message to the arbiter server by the alternate stratum-1 server to put the arbiter into takeover mode. The receiving server returns an arbiter takeover state flag and a response block. In the message command data field, the active stratum-1 communication timeout flag is set as follows: the flag is set to, for instance, 0, if the server does not have attachment to the active stratum server; the flag is set to, for instance, 1, if the server has attachment to the active stratum server and an active stratum-1 communication has been recognized.

If the response to the set arbiter takeover mode message command has the takeover state flag equal to 1, the inactive stratum-1 server recognizes an active stratum-1 failure; if the response to the set arbiter takeover mode message command has a takeover state flag equal to 0, the inactive stratum-1 server does not recognize an active stratum-1 failure and performs the following: if the response has the active stratum-1 communication timeout flag equal to 1, the server exits takeover mode; if the response has the active stratum-1 communication timeout flag equal to 0, the inactive stratum-1 remains in takeover mode.

The inactive stratum-1 server leaves the takeover mode when any of the following occur:

It receives a set arbiter takeover message response containing the takeover state flag equal to 0 and the communication timeout flag equal to one.

It issues a reset arbiter takeover mode command to the arbiter. The reset arbiter takeover mode operation is issued to the arbiter server by the alternate stratum-1 server to take the arbiter out of takeover mode. This operation is forwarded to the arbiter server via a message.

It performs an active stratum-1 takeover procedure.

If the inactive stratum-1 server receives an established STP path message command from the active stratum-1 server while in takeover mode, it issues the reset arbiter takeover mode command to the arbiter; and establishes initiative to perform STP path initialization on paths to the active stratum-1 server.

When the arbiter server receives a set arbiter takeover mode message command from the inactive stratum-1 server, it enters arbiter takeover mode. It leaves arbiter takeover mode when any of the following occur:

The arbiter responds to a set arbiter takeover message command with the response that includes takeover state flag equal to 0 and a communication timeout flag equal to 1.

The arbiter accepts a reset arbiter takeover mode command from the inactive stratum-1 server.

The arbiter receives a stratum-1 configuration update.

While in the arbiter takeover mode, the arbiter is in one of the following arbiter takeover states: takeover pending state; or takeover active state. The arbiter takeover state is indicated in the response to the set arbiter takeover mode command.

The arbiter enters the takeover pending state when it enters arbiter takeover mode and both the following conditions exists: The arbiter is attached to the active stratum-1 server; and an active stratum-1 communication timeout does not exist in the arbiter.

The takeover pending state indicates that the inactive stratum-1 server cannot perform active stratum-1 takeover. The arbiter leaves takeover pending state when it enters the takeover active state or when the arbiter leaves the arbiter takeover mode.

The arbiter enters the takeover active state under the following circumstances:

When it enters arbiter takeover mode and either of the following conditions exist: the active stratum-1 server is not attached to the arbiter, or the active stratum-1 server is attached to the arbiter and an active stratum-1 communication timeout condition has been recognized at the arbiter.

When it is in the takeover pending state and the active stratum-1 server leaves the attached state or the active stratum-1 communication timeout is recognized.

The takeover active state indicates to the inactive stratum-1 server that it can perform an active stratum-1 takeover. If the arbiter enters the takeover active state after responding to the set arbiter takeover command, the arbiter issues the arbiter takeover active command (i.e., sends a message) to the inactive stratum-1 server to indicate that it has transitioned from the takeover pending to the takeover active state.

When the arbiter enters the takeover active state, any remaining paths in the path group for the active stratum-1 server are put in the uninitialized state indicating a communication error. While in the takeover active state, the arbiter responds with the takeover active state response code to Establish STP Path (ESP) message commands from the active stratum-1 server.

The arbiter leaves the takeover pending state when it leaves the arbiter takeover mode.

Figure 19B:
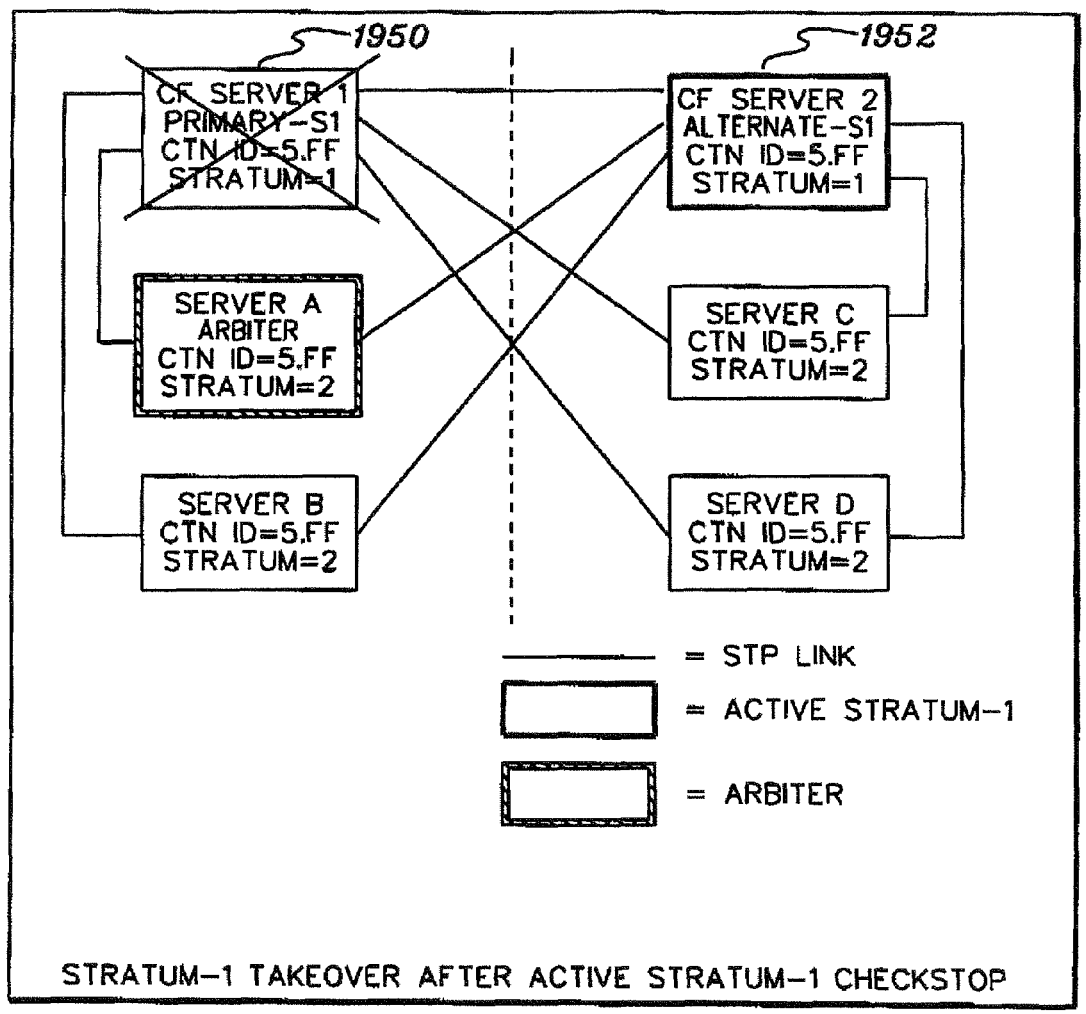
FIG. 19B is a pictorial depiction of a stratum-1 takeover after active stratum-1 checkstop, in accordance with an aspect of the present invention.

One Example of stratum-1 recovery in a triad configuration is described with reference to FIG. 19B.

1. Server 1 (1950) goes into a check stop state.
2. Server 2 (1952) detects loss of attachment to Server 1.
3. Server 2 issues a set takeover mode control command to the arbiter server.
4. The arbiter enters takeover mode in response to the set takeover mode command as follows:

If it does not have attachment to Server 1, it responds that it has entered the takeover active state indicating the inactive stratum-1 server can take over the role of active stratum-1 server. When in takeover active state, the arbiter server does not allow paths to be established with the active stratum-1 server.

If it does not have attachment to Server 1, it responds that it has entered the takeover pending state indicating the inactive stratum-1 server cannot take over the role of active stratum-1 server. If the arbiter loses attachment to Server 1 while in the takeover pending state, it issues the arbiter takeover state active notification to Server 2.

5. The arbiter indicates that it is in takeover active state, either in the set takeover mode command or with the arbiter takeover state active notification command to Server 2.
6. Server 2 performs the CTN parameter update procedure to set itself as the active stratum-1.
7. When the stratum-1 configuration change becomes current, Server 2 issues a configuration change notification change to the console.
8. A configuration change machine check is generated at all servers of the network to report the stratum-1 configuration change.

Figure 19C:
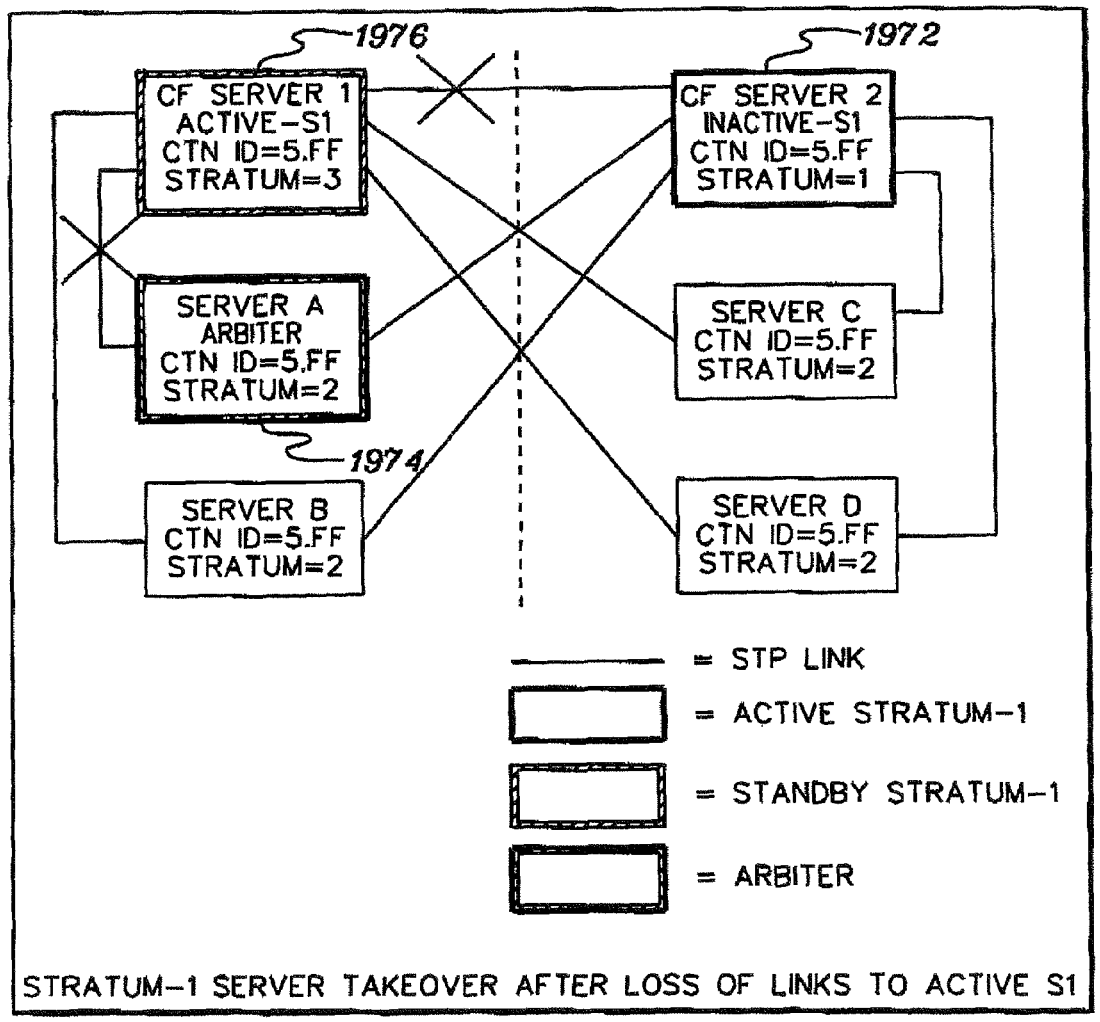
FIG. 19C is a pictorial depiction of a stratum-1 server takeover after loss of links to the active stratum-1, in accordance with an aspect of the present invention.

As a further example, with reference to FIG. 19C, a recovery procedure is described for the stratum-1 server takeover after loss of links to active SI.

1. With reference to FIG. 19C, it is shown that Server 2 (1972) and the arbiter (1974) detect loss of attachment to Server 1 (1976).
2. Server 2 issues the set takeover mode control command to the arbiter server.
3. The arbiter indicates that it is in the takeover active state, either in the response to the set takeover mode command or with the arbiter takeover state active notification command to Server 2, indicating it authorizes a takeover.
4. Server 2 performs the CTN parameter update procedure to set itself as the active stratum-1.
5. When the stratum-1 configuration change becomes current, Server 2 issues a configuration change notification to the console.
6. Server 1 detects loss of attachment to Servers 2 and 3 and performs the surrender procedure. It drops to stratum-3 as a result of its attachment to Server B.
7. A configuration change machine check interrupt request is generated at all servers of the network to report the stratum-1 configuration change and that Server 1 is at stratum-3.

Figure 19D:
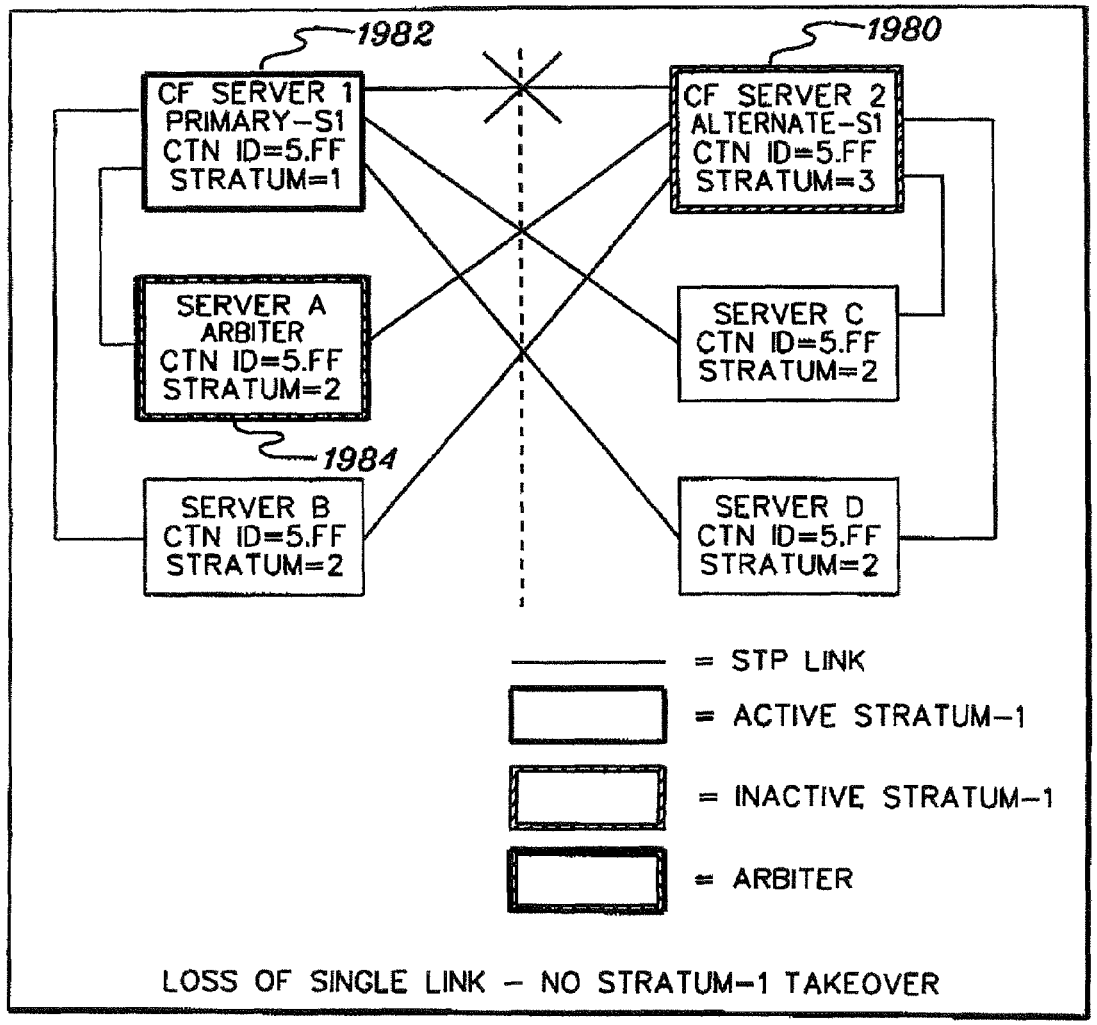
FIG. 19D is a pictorial depiction of a loss of single link-no stratum-1 takeover, in accordance with an aspect of the present invention.

In the following example, a stratum-1 takeover is not performed. This is described with reference to FIG. 19D. In this example:

1. Server 2 (1980) detects loss of attachment to Server 1 (1982).
2. Server 2 issues the set takeover mode control command to the arbiter server (1984).
3. The arbiter indicates that it is in the takeover pending state in the response to the set takeover mode command, indicating the inactive stratum-1 server cannot take over the role of active stratum-1 server.
4. Server 2 does not perform recovery and drops to stratum-3.
5. If the link is restored, Server 2 issues the reset takeover mode command to the arbiter.
6. Server 2 generates a configuration change machine check request to report a stratum level change.

In both the dual stratum-1 recovery (FIG. 16) and the triad stratum-1 recovery (FIG. 17) an active stratum-1 takeover procedure is performed by the inactive stratum-1 server in response to recognizing the active stratum-1 failure. The procedure results in the inactive stratum-1 server taking over the role of the active stratum-1 server for the CTN.

Figure 20:
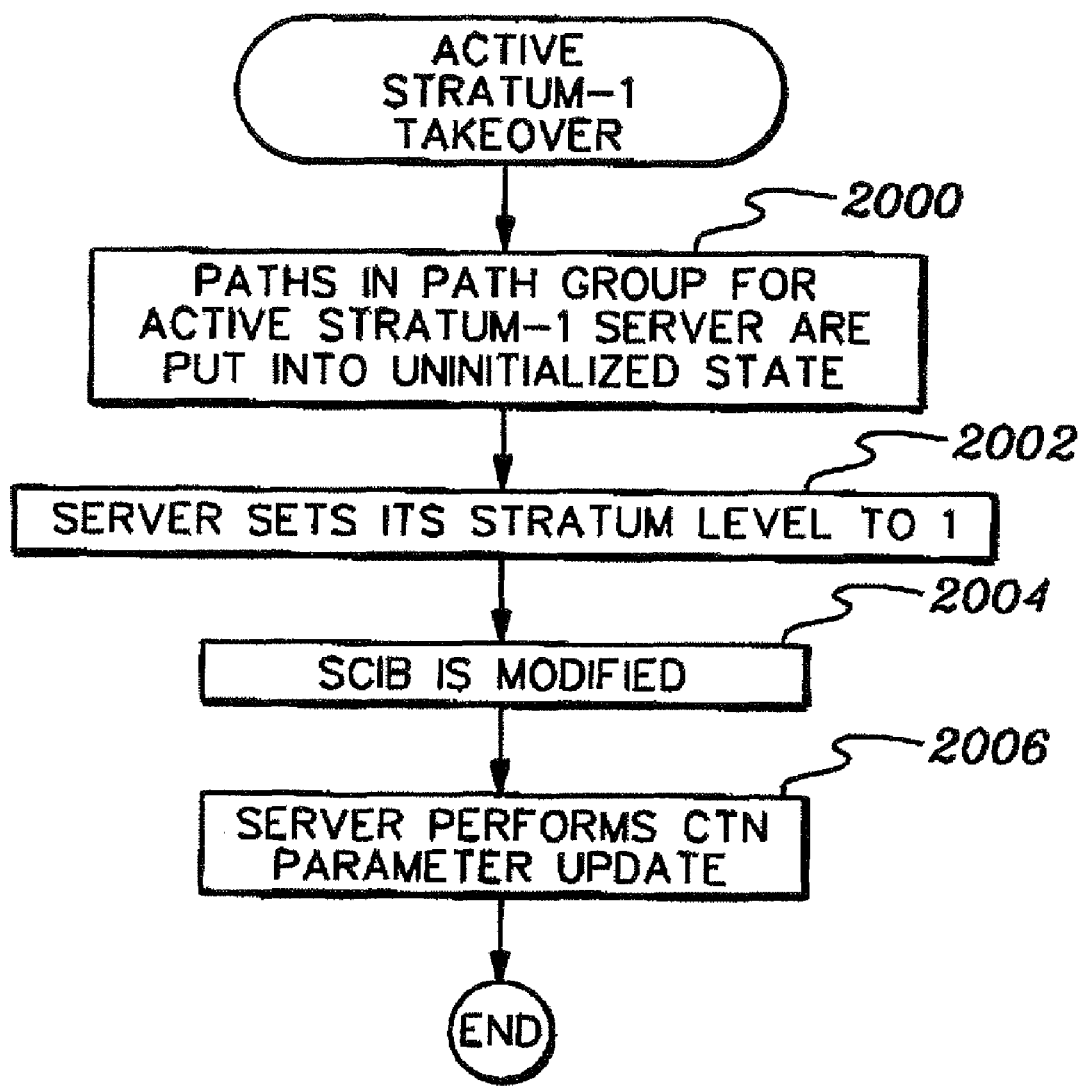
FIG. 20 depicts one embodiment of the logic associated with performing an active stratum-1 takeover, in accordance with an aspect of the present invention.

One embodiment of the logic associated with an active stratum-1 takeover is described with reference to FIG. 20. Initially, all remaining paths in the path group for the active stratum-1 server are put into an uninitialized state with the URC indicating a communication error, STEP 2000.

Additionally, the server sets its stratum level to 1, STEP 2002, and the stratum-1 configuration information block at the server and at the console is modified, STEP 2004. In one example, the SCIB is modified such that the active bit is modified to indicate the server as the active stratum-1 server; the stratum-1 maximum short term skew rate change field is set to the value for the server; the stratum-1 configuration timestamp is set to the current time; and the other fields are unmodified.

In addition to the above, the server performs the CTN parameter update procedure to modify the stratum-1 configuration information block for the CTN to the value in the updated SCIB, STEP 2006. The stratum-1 configuration update time and the new stratum-1 configuration information block is set to the stratum-1 configuration timestamp in the SCIB. This concludes active stratum-1 takeover.

A yet further procedure that is performed is the active stratum-1 surrender procedure, which is performed in a dual server or triad configuration by the active stratum-1 server, when it recognizes that it has entered the active stratum-1 server failure state. The procedure results in the active stratum-1 server giving up the role of the active stratum-1 server for the CTN.

Figure 21:
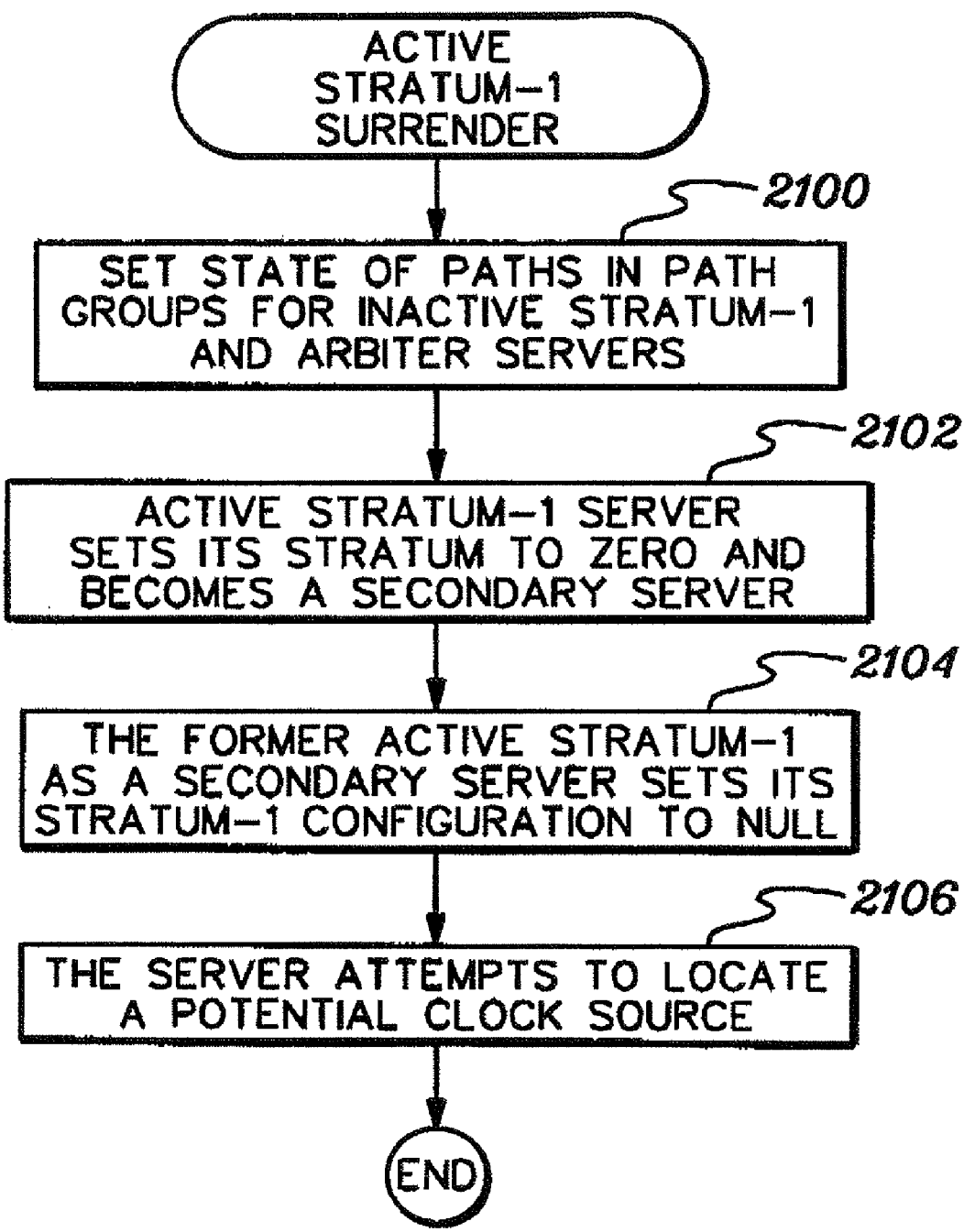
FIG. 21 depicts one embodiment of the logic associated with performing an active stratum-1 surrender, in accordance with an aspect of the present invention.

One embodiment of the logic associated with the active stratum-1 surrender procedure is described with reference to FIG. 21. In one example, the paths and the path groups for the inactive stratum-1 and arbiter servers at the active stratum-1 server are set to the uninitialized state with the URC indicating initialization not complete, STEP 2100. Further, the active stratum-1 server sets its stratum level to 0 and becomes a secondary server, STEP 2102. The former active stratum-1 server as a secondary server sets its stratum-1 configuration to the null configuration, STEP 2104. Additionally, it attempts to locate a potential clock source, via its links, STEP 2106. This completes the surrender process.

Figure 22A:
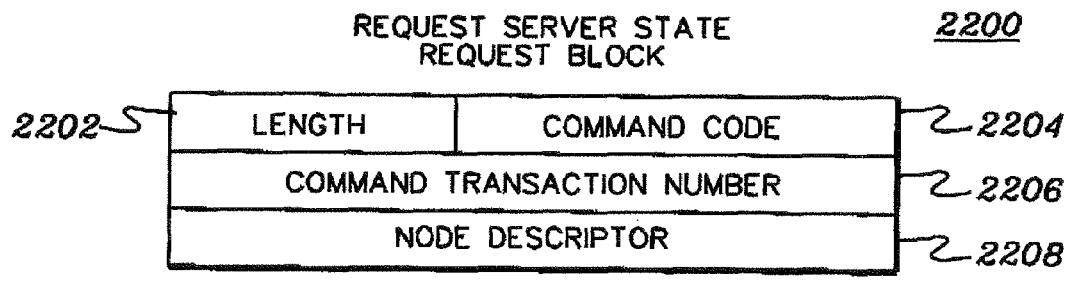
FIG. 22A depicts one embodiment of a request server state request block, in accordance with an aspect of the present invention.

As described above, the request server state command is used to request the operational status of the server specified by the node descriptor in the request block. The status of the specified server is provided asynchronously by the console using the write server state command. One embodiment of a command request block for the request server state command is described with reference to FIG. 22A.

A request server state request block 2200 includes, for instance, the following:

a) Length 2202: This field includes a value specifying a command block length.
b) Command Code 2204: This field specifies the read server state command.
c) Command Transaction Number 2206: This field includes a value that is associated with the command being issued. The command transaction number is returned in the response block for the command.
d) Node Descriptor 2208: This field includes a node descriptor of the server for which status is being requested.

Figure 22B:
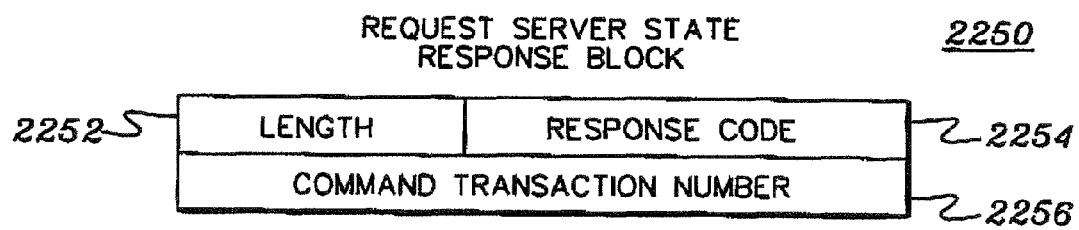
FIG. 22B depicts one embodiment of a request server state response block, in accordance with an aspect of the present invention.

One embodiment of a command response block 2250 for the request server state command is described with reference to FIG. 22B. Response block 2250 includes, for instance:

a) Length 2252: This field includes a value specifying a command block length.
b) Response Code 2254: This field includes the response code for the command.
c) Command Transaction Number 2256: This field includes the value provided in the command transaction number field of the command request block.

Figure 23A:
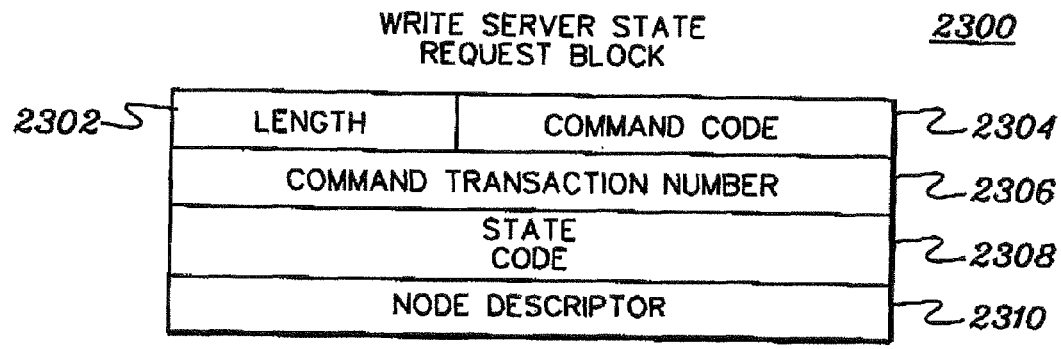
FIG. 23A depicts one embodiment of a write server state request block, in accordance with an aspect of the present invention.

The write server state command provides the operational status of the server specified in the request block. The command is issued by the console after accepting a request server state command. One embodiment of a command request block for the write server state command is described with reference to FIG. 23A. In one example, a write server state request block 2300 includes the following:

a) Length 2302: This field includes a value specifying a command block length.
b) Command Code 2304: This field includes a value specifying the write server state command.
c) Command Transaction Number 2306: This field includes a value that is associated with the command being issued. The command transaction number is returned in the response block for the command.
d) State Code 2308: This field includes a value that indicates the state of the server specified by the node descriptor in the request block. The states include, for instance:
The server is operational.
The server state is unknown.
The server is in the checkstopped state.
The server is powered off.
e) Node Descriptor 2310: This field includes the node descriptor of the server for which status is being reported.

Figure 23B:
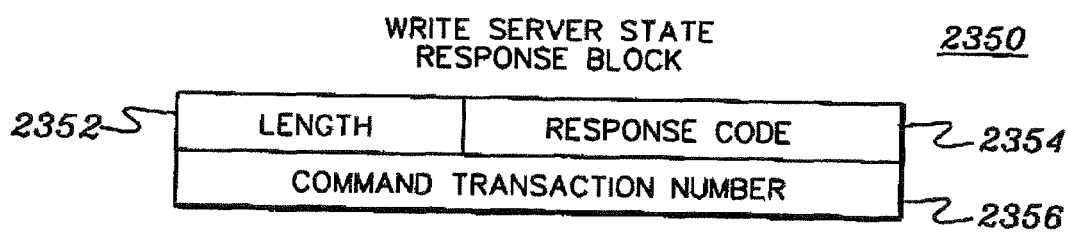
FIG. 23B depicts one embodiment of a write server state response block, in accordance with an aspect of the present invention.

One embodiment of the command response block for the write server state command is described with reference to FIG. 23B. In one example, a write server state response block 2350 includes the following:

a) Length 2352: This field includes the value specifying a command block length.
b) Response Code 2354: This field includes the response code for the command.
c) Command Transaction Number 2356: This field includes the value provided in the command transaction number field of the command request block.

In one embodiment, one or more aspects of the present invention can be executed in a processing environment that is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety. In such an environment instructions and/or logic, which is specified in the z/Architecture® and designed to execute on a z/Architecture® machine, is emulated to execute on an architecture other than the z/Architecture®. One example of this processing environment is described with reference to FIGS. 24-25.

Figure 24:
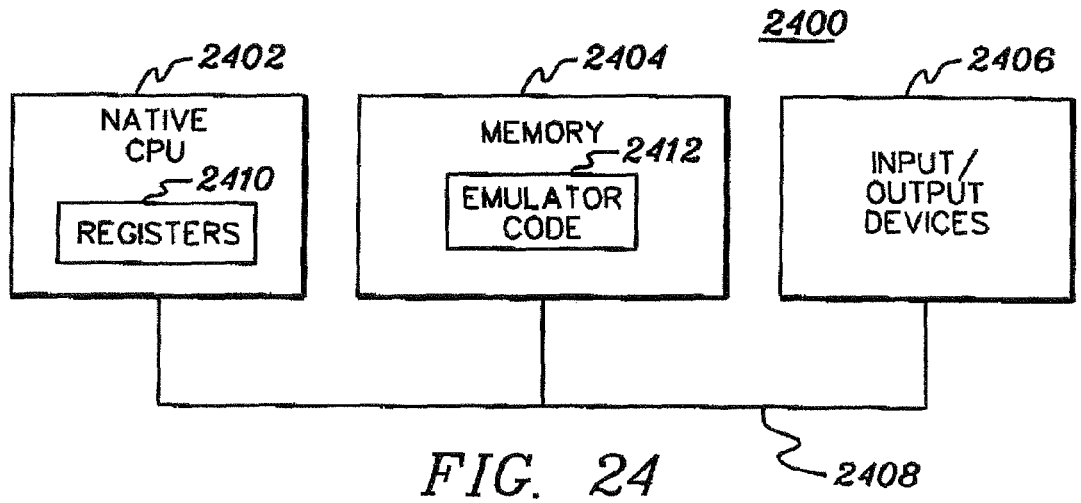
FIG. 24 depicts one embodiment of a processing environment to incorporate and use one or more aspects of the present invention.

Referring to FIG. 24, one embodiment of a processing environment to incorporate and use one or more aspects of the present invention is described. Processing environment 2400 includes, for instance, a native central processing unit 2402, a memory 2404 (e.g., main memory) and one or more input/output (I/O) devices 2406 coupled to one another via, for example, one or more buses 2408 and/or other connections. As examples, processing environment 2400 may include a Power PC® processor, a pSeries® server, or an xSeries® server offered by International Business Machines Corporation, Armonk, N.Y.; an HP Superdome with Intel® Itanium® 2 processors offered by Hewlett-Packard Company, Palo Alto, Calif.; and/or other machines based on architectures offered by IBM®, Hewlett-Packard, Intel®, Sun Microsystems or others. Power PC®, pSeries® and xSeries® are registered trademarks of International Business Machines Corporation, Armonk, N.Y., U.S.A. Intel® and Itanium® 2 are registered trademarks of Intel Corporation, Santa Clara, Calif.

Native central processing unit 2402 includes one or more native registers 2410, such as one or more general purpose registers and/or one or more special purpose registers, used during processing within the environment. These registers include information that represent the state of the environment at any particular point in time.

Moreover, native central processing unit 2402 executes instructions and code that are stored in memory 2404. In one particular example, the central processing unit executes emulator code 2412 stored in memory 2404. This code enables the processing environment configured in one architecture to emulate another architecture. For instance, emulator code 2412 allows machines based on architectures other than the z/Architecture, such as Power PC® processors, pSeries® servers, xSeries® servers, HP Superdome® servers, or others to emulate the z/Architecture® and to execute software and instructions developed based on the z/Architecture®.

Figure 25:
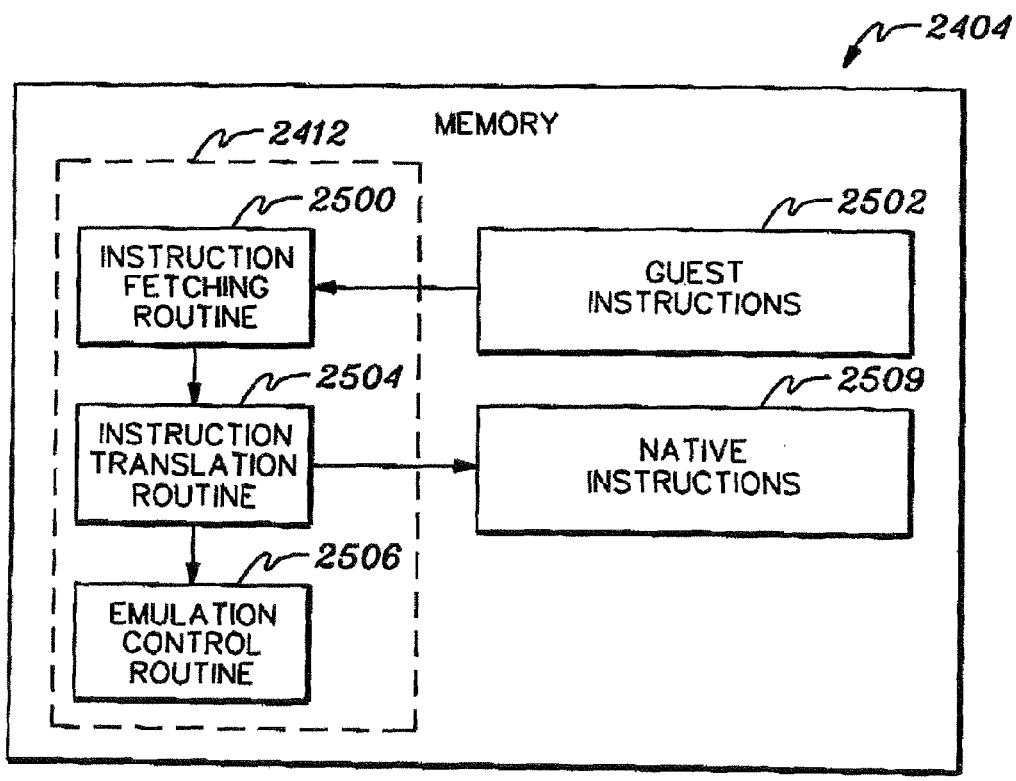
FIG. 25 depicts further details of the memory of FIG. 24, in accordance with an aspect of the present invention.

Further details relating to emulator code 2412 are described with reference to FIG. 25. Guest instructions 2502 comprise software instructions (e.g., machine instructions) that were developed to be executed in an architecture other than that of native CPU 1002. For example, guest instructions 2502 may have been designed to execute on z/Architecture® processor 902, but are instead being emulated on native CPU 2402 (which may be for example an Intel® Itanium® 2 processor). In one example, emulator code 2412 includes an instruction fetching routine 2500 to obtain one or more guest instructions 2502 from memory 2404, and to optionally provide local buffering for the instruction obtained.

Emulator code 2412 further includes an instruction translation routine 2504 to determine the type of guest instruction that has been obtained and to provide one or more native instructions 2509 that correspond to the guest instruction. In one example, the providing includes creating during, for instance, a translation process, a native stream of instructions for a given guest instruction. This includes identifying the function and creating the equivalent native instructions. In a further example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

Emulator code 2412 further includes an emulation control routine 2506 to cause the native instructions to be executed. Emulation control routine 2506 may cause native CPU 2402 to execute a routine of native instructions that emulate one or more previously obtained guest instructions and, at the conclusion of such execution, to return control to the instruction fetch routine to emulate the obtaining of the next guest instruction or group of guest instructions. Execution of the native instructions 2509 may include loading data into a register from memory 2404; storing data back to memory from a register; or performing some type of arithmetic or logical operation, as determined by the translation routine. Each routine is, for instance, implemented in software, which is stored in memory and executed by the native central processing unit 2402. In other examples, one or more of the routines or operations are implemented in firmware, hardware, software or some combination thereof. The registers of the emulated guest processor may be emulated using the registers 2410 of the native CPU or by using locations in memory 2404. In embodiments, the guest instructions 2502, native instructions 2509, and emulation code 2412 may reside in the same memory or may be dispersed among different memory devices.

In yet a further embodiment, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a system (e.g., computer system) or sold separately.

Figure 26:
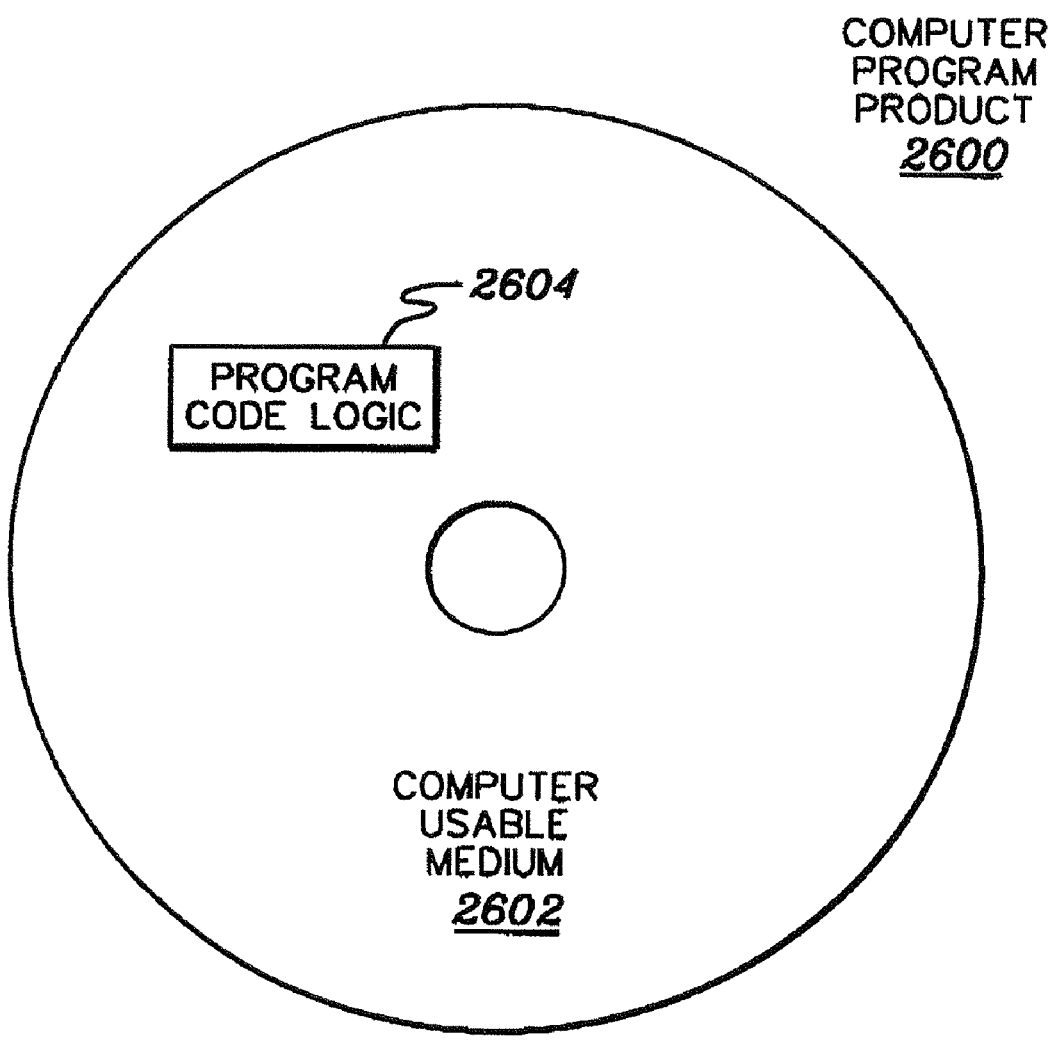
FIG. 26 depicts one example of a computer program product to incorporate one or more aspects of the present invention.

One example of an article of manufacture or a computer program product incorporating one or more aspects of the present invention is described with reference to FIG. 26. A computer program product 2600 includes, for instance, one or more computer usable media 2602 to store computer readable program code means or logic 2604 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Described herein are capabilities that facilitate the maintaining of time synchronization by multiple distinct computing systems to form a Coordinated Timing Network. Servers in the timing network make use of the Server Time Protocol to pass timekeeping information over existing high speed data links between systems that provide the capability for the time of day clocks at each system to be synchronized to the accuracy required in today's high end computing systems. The use of STP over high-speed, low latency links provides the capability to synchronize all systems in the CTN to the accuracy of, for instance, a few microseconds when based on a reference time provided by a single server.

STP provides the capability to set and maintain timekeeping information within the CTN, such as time zone, daylight savings time offset, and a leap seconds offset. The information may be updated within the CTN in a scheduled and coherent fashion, such that all changes occur at the same time at all servers in the CTN. This prevents potential system exposures and disruptions that occur when these parameters are updated in a haphazard fashion, creating time setting discrepancies between computers.

CTN parameters may be set and read by an operator via the STP console interface. CTN parameters include server connectivity, local time information, such as time zone and daylight savings time, and the leap seconds required to compute the UTC. The console itself is any element that provides an operator interface to display and set CTN parameters, and that has the capability to communicate with the STP facility.

In one aspect of the present invention, a single active stratum-1 server is provided as the clock source for the network. The time of day clock at the active stratum-1 server may be set to any time, but generally, is set to an external time reference, such as a dial up to UTC. Other servers are permitted to join the CTN, if they have an undefined stratum-1 configuration, known as a null configuration, or if they have a stratum-1 configuration that matches that of the primary time server. Thus, synchronization accuracy within the CTN is not dependent on the quality of an external time source or even of the existence of an external time source at the stratum-1 server. This ensures that servers in the CTN are synchronizing to the same root primary reference time.

In a further aspect of the present invention, an alternate server is defined such that it is capable of taking over as the active stratum server in the event of a failure at the active stratum-1 server. This prevents a single point of failure for the CTN, such that servers in the CTN can maintain or regain synchronization within the timing network despite a failure at the active stratum-1 server.

Additional information regarding timing networks is provided in the following patent applications, each of which is hereby incorporated herein by reference in its entirety: U.S. Provisional Ser. No. 60/887,584 entitled "Facilitating Synchronization Of Servers In A Coordinated Timing Network", filed Jan. 31, 2007; U.S. Ser. No. 11/876,199 entitled "Definition Of A Primary Active Server In A Coordinated Timing Network", filed Oct. 22, 2007; U.S. Provisional Ser. No. 60/887,562 entitled "Defining A Stratum-1 Configuration In A Coordinated Timing Network", filed Jan. 31, 2007; U.S. Ser. No. 11/876,240 entitled "Employing Configuration Information To Determine The Role Of A Server In A Coordinated Timing Network", filed Oct. 22, 2007; U.S. Provisional Ser. No. 60/887,576 entitled "Method And System For Establishing A Logical Path Between Servers In A Coordinated Timing Network", filed Jan. 31, 2007; U.S. Ser. No. 11/876,272 entitled "Establishing A Logical Path Between Servers In A Coordinated Timing Network", filed Oct. 22, 2007; U.S. Provisional Ser. No. 60/887,586 entitled "Facilitating Recovery In A Coordinated Timing Network", filed Jan. 31, 2007; U.S. Ser. No. 11/876,323 entitled "Facilitating Recovery In A Coordinated Timing Network", filed Oct. 22, 2007; U.S. Provisional Ser. No. 60/887,544 entitled "Channel Subsystem Server Time Protocol Commands", filed Jan. 31, 2007; U.S. Ser. No. 11/876,796 entitled "Channel Subsystem Server Time Protocol Commands and System Therefor," filed Oct. 23, 2007; U.S. Provisional Ser. No. 60/887,512 entitled "Server Time Protocol Messages And Methods", filed Jan. 31, 2007; U.S. Ser. No. 11/940,518 entitled "Server Time Protocol Messages and Methods," filed Nov. 15, 2007; U.S. Ser. No. 11/468,352, entitled "Coordinated Timing Network Configuration Parameter Update Procedure," filed Aug. 30, 2006; U.S. Ser. No. 11/460,025, entitled "Directly Obtaining By Application Programs Information Usable In Determining Clock Accuracy," filed Jul. 26, 2006; U.S. Ser. No. 11/223,886, entitled "System And Method For TOD-Clock Steering;" U.S. Ser. No. 11/532,168, entitled "Synchronization Signal For TOD-Clock Steering Adjustment;" U.S. Ser. No. 11/468,501, entitled "Managing Data Access Via A Loop Only If Changed Locking Facility;" U.S. Ser. No. 11/223,878, entitled Clock Filter Dispersion;" U.S. Ser. No. 11/223,876, entitled "Method And System For Clock Skew And Offset Estimation;" U.S. Ser. No. 11/223,577, entitled "Use Of T4 Timestamps To Calculate Clock Offset And Skew;" and U.S. Ser. No. 11/223,642 entitled "System And Method For Calibrating A TOD Clock."

Advantageously, one or more aspects of the present invention enable the providing of quality timekeeping information allowing synchronization and accuracy requirements to be met. The systems within the CTN remain tightly synchronized with a less stringent requirement for synchronization accuracy to an external time source, such as UTC. Use of expensive dedicated timing links and/or a separate external box are not required. Further, the requirement for each server to attach to an external time server or to have GPS is not required.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

Moreover, although various control blocks have been described, each of these control blocks can include additional, less and/or different information. The location within the control block and the size of each field within the control block can vary for different embodiments.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the claims.

What is claimed is:

1. A computer program product for providing a coordinated timing network, the computer program product comprising:
   a storage medium readable by a processor and storing instructions for execution by the processor for performing a method comprising:
      obtaining, by a server of a timing network, timing clock information for the server, said server obtaining the timing clock information from a single primary active server of the timing network and not from an external clock source, said single primary active server being the primary reference time to the server and said single primary active server obtaining the timing clock information from an external time source;
      obtaining by the server timing network data including configuration information of the timing network, primary reference time information, time zone information, and leap second change scheduling;
      using by the server at least a portion of the timing network data and the timing clock information to ensure the server of the timing network is adhering to the configuration and is synchronized to a coordinated server time (CST) timing network specified synchronization threshold that meets high-speed computing requirements; and
      recognizing by the server that it is out of synchronization and may not have valid configuration information, wherein the server that is out of synchronization is not a part of the timing network.

2. The computer program product of claim 1, wherein the server cannot operate for more than a prespecified amount of time without knowing the configuration information.

3. The computer program product of claim 1, wherein the configuration comprises the single primary active server, the server and one or more other servers, and wherein the obtaining the timing network data, the using and the recognizing are performed by each server of the one or more other servers.

4. The computer program product of claim 1, wherein the single primary active server and the server comprise the same timing network identifier.

5. The computer program product of claim 1, wherein the obtaining the timing network data is performed by passing information via messages using a Server Time Protocol message protocol.

6. The computer program product of claim 1, wherein the method further comprises:
   obtaining by the single primary active server the primary reference time from an external time source; and
   steering by the single active primary server its time-of-day clock to the primary reference time.

7. The computer program product of claim 1, wherein the single primary active server and the server are coupled via one or more low latency links.

8. The computer program product of claim 1, wherein the single primary active server is in network communications with the server via a Coordinated Timing Network configured to maintain time synchronization, the single primary active server sending Server Time Protocol messages by way of said Coordinated Timing Network.

9. The computer program product of claim 1, wherein the using by the server at least a portion of the timing network data and the timing clock information to ensure the server is adhering to the configuration comprises at least one of determining that its timing network identifier is the same as the timing network identifier of the single primary active server, and determining that configuration information obtained by the server is up-to-date information for the timing network.

10. The computer program product of claim 1, wherein the server has associated therewith a timing mode indicating whether the server is in local, external time reference (ETR) or server time protocol (STP) timing mode.

11. The computer program product of claim 1, wherein the server has associated therewith a timing state indicating whether the server is in a synchronized, unsynchronized or stopped state.

12. The computer program product of claim 1, wherein the server has associated therewith a clock source state indicating whether the server has a usable clock source.

13. A computer system for providing a coordinated timing network, the computer system comprising:
   a memory; and
   a processor in communications with the memory, wherein the computer system is capable of performing a method, said method comprising:
      obtaining, by a server of a timing network, timing clock information for the server, said server obtaining the timing clock information from a single primary active server of the timing network and not from an external clock source, said single primary active server being the primary reference time to the server and said single primary active server obtaining the timing clock information from an external time source;
      obtaining by the server timing network data including configuration information of the timing network, primary reference time information, time zone information, and leap second change scheduling;
      using by the server at least a portion of the timing network data and the timing clock information to ensure the server of the timing network is adhering to the configuration and is synchronized to a coordinated server time (CST) timing network specified synchronization threshold that meets high-speed computing requirements; and
      recognizing by the server that it is out of synchronization and may not have valid configuration information, wherein the server that is out of synchronization is not a part of the timing network.

14. The computer system of claim 13, wherein the server cannot operate for more than a prespecified amount of time without knowing the configuration information.

15. The computer system of claim 13, wherein the configuration comprises the single primary active server, the server and one or more other servers, and wherein the obtaining the timing network data, the using and the recognizing are performed by each server of the one or more other servers.

16. The computer system of claim 13, wherein the single primary active server and the server comprise the same timing network identifier.

17. The computer system of claim 13, wherein the single primary active server and the server are coupled via one or more low latency links.

18. The computer system of claim 13, wherein the single primary active server is in network communications with the server via a Coordinated Timing Network configured to maintain time synchronization, the single primary active server sending Server Time Protocol messages by way of said Coordinated Timing Network.

19. The computer system of claim 13, wherein the server has associated therewith a timing mode indicating whether the server is in local, external time reference (ETR) or server time protocol (STP) timing mode.

20. A method to provide a coordinated timing network, said method comprising:

obtaining, by a server of a timing network, timing clock information for the server, said server obtaining the timing clock information from a single primary active server of the timing network and not from an external clock source, said single primary active server being the primary reference time to the server and said single primary active server obtaining the timing clock information from an external time source;

obtaining by the server timing network data including configuration information of the timing network, primary reference time information, time zone information, and leap second change scheduling;

using by the server at least a portion of the timing network data and the timing clock information to ensure the server of the timing network is adhering to the configuration and is synchronized to a coordinated server time (CST) timing network specified synchronization threshold that meets high-speed computing requirements; and recognizing by the server that it is out of synchronization and may not have valid configuration information, wherein the server that is out of synchronization is not a part of the timing network.

21. The method of claim 20, wherein the server cannot operate for more than a prespecified amount of time without knowing the configuration information.

22. The method of claim 20, wherein the configuration comprises the single primary active server, the server and one or more other servers, and wherein the obtaining the timing network data, the using and the recognizing are performed by each server of the one or more other servers.

23. The method of claim 20, wherein the single primary active server and the server comprise the same timing network identifier.

24. The method of claim 20, wherein the single primary active server is in network communications with the server via a Coordinated Timing Network configured to maintain time synchronization, the single primary active server sending Server Time Protocol messages by way of said Coordinated Timing Network.

* * * * *